(12) United States Patent
Morimoto et al.

(10) Patent No.: US 8,055,079 B2
(45) Date of Patent: Nov. 8, 2011

(54) IMAGE PROCESSING METHOD, IMAGE PROCESSING APPARATUS, AND IMAGE FORMING APPARATUS

(75) Inventors: Atsuhisa Morimoto, Nara (JP); Masakazu Ohira, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 917 days.

(21) Appl. No.: 12/042,996

(22) Filed: Mar. 5, 2008

(65) Prior Publication Data
US 2008/0219560 A1 Sep. 11, 2008

(30) Foreign Application Priority Data

Mar. 6, 2007 (JP) ................................. 2007-056291
Feb. 21, 2008 (JP) ................................. 2008-040439

(51) Int. Cl.
*G06K 9/62* (2006.01)
(52) U.S. Cl. ........ 382/209; 382/173; 382/272; 382/176; 382/162; 382/195; 382/199
(58) Field of Classification Search .................. 382/209, 382/173, 272, 176, 162, 195, 199
See application file for complete search history.

(56) References Cited

U.S. PATENT DOCUMENTS

| 5,465,353 A | 11/1995 | Hull et al. | |
| 6,628,833 B1* | 9/2003 | Horie | 382/173 |
| 2007/0058211 A1* | 3/2007 | Kubota | 358/462 |
| 2009/0041340 A1 | 2/2009 | Suzuki et al. | |

FOREIGN PATENT DOCUMENTS

| JP | 7-282088 A | 10/1995 |
| WO | WO 2006/073076 | 7/2006 |
| WO | WO-2006/092957 A1 | 9/2006 |

OTHER PUBLICATIONS

Nakai, T. et al., Technical Report of the Institute of Electronics, Information and Communication Engineers, Mar. 2005, pp. 1-6.

* cited by examiner

*Primary Examiner* — Mike Rahmjoo
(74) *Attorney, Agent, or Firm* — Birch, Stewart, Kolasch & Birch, LLP

(57) ABSTRACT

Based on an area detection signal, a layer separation section outputs a text component of a document, to a feature point calculating section, and generates four layers from a pictorial component of the document to output the generated layers to the feature point calculating section. The feature point calculating section sums feature points extracted for each component. A features calculating section calculates a hash value based on the feature points. A vote processing section searches a hash table based on the hash value, and votes for a reference image associated with the hash value. Based on the voting result, a similarity determination processing section determines whether the document image is similar to any reference image, and then outputs the determination result. Thus, even if the document contains a photograph, accurate matching can be performed.

12 Claims, 26 Drawing Sheets

F I G. 4
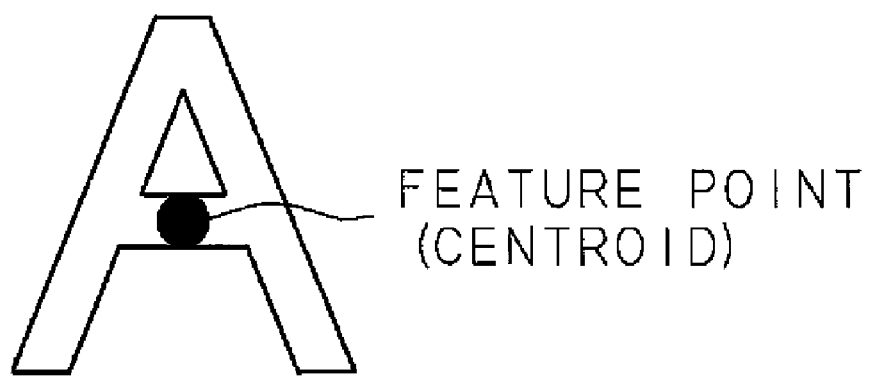

F I G. 5
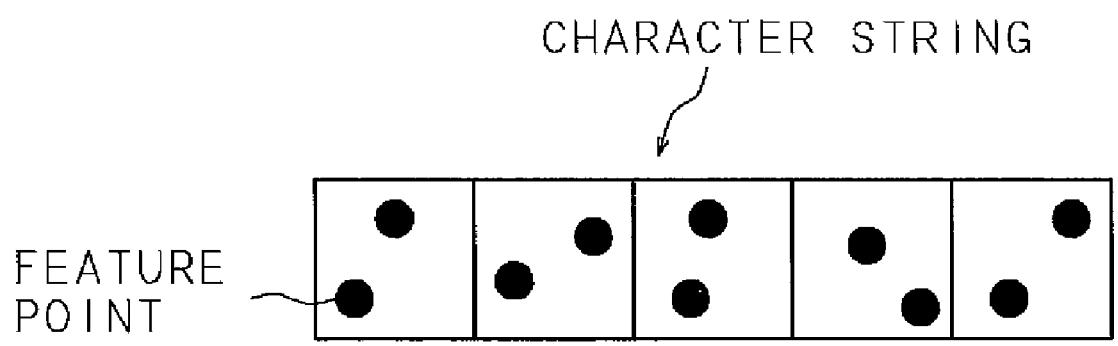

DOCUMENT IMAGE (PICTORIAL COMPONENT)

LAYER 4 (DENSITY VALUE: 194-255)
LAYER 3 (DENSITY VALUE: 128-193)
LAYER 2 (DENSITY VALUE: 64-127)
LAYER 4 (DENSITY VALUE: 0-63)

LAYER 4
LAYER 3
LAYER 2
LAYER 1

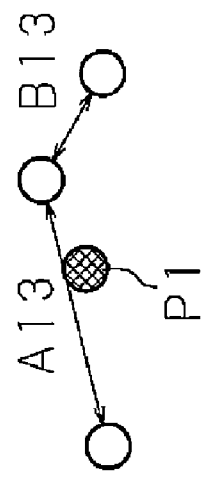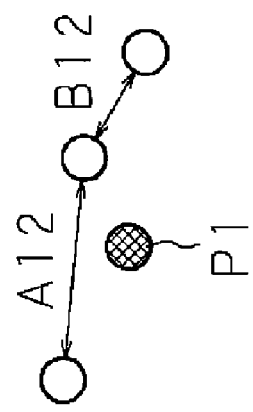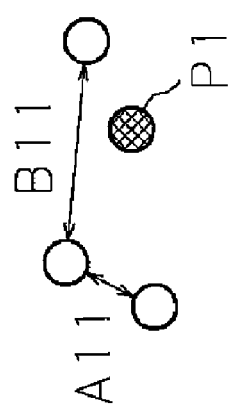

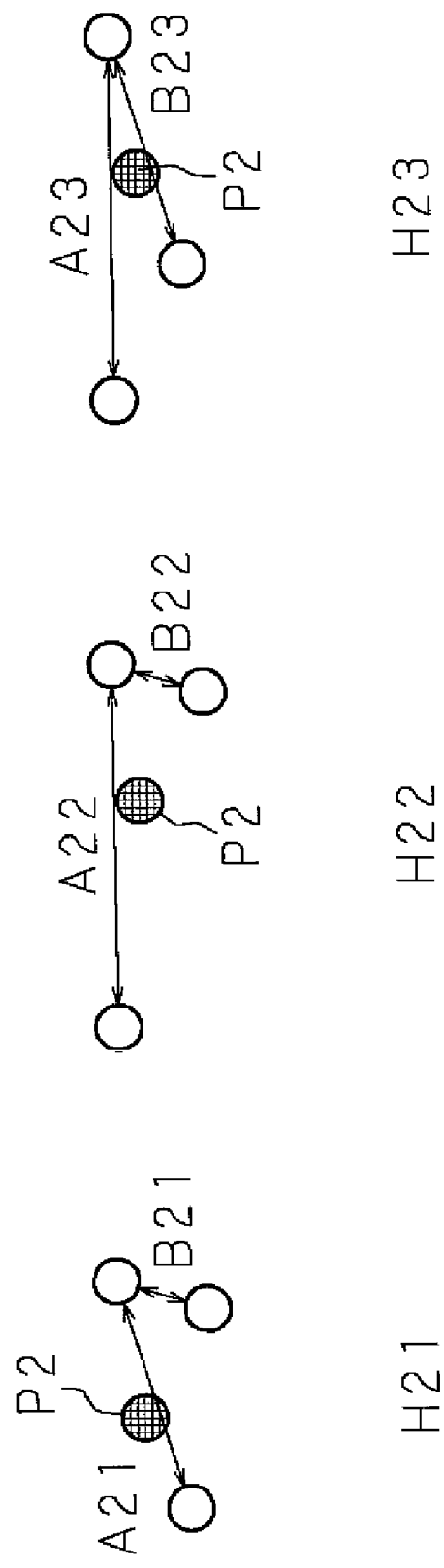

FIG. 13A

| HASH VALUE | INDEX INDICATING DOCUMENT |
|---|---|
| H1 | ID1 |
| H2 | ID3 |
| H3 | ID1, ID2 |
| H4 | ID3 |
| H5 | ID1 |
| H6 | ID1, ID2 |
| ⋮ | ⋮ |

FIG. 13B

| HASH VALUE | INDEX INDICATING DOCUMENT |
|---|---|
| H1 | ID1, ID1 |
| H2 | ID3 |
| H3 | ID1, ID2 |
| H4 | ID3 |
| H6 | ID1, ID2 |
| ⋮ | ⋮ |

F I G. 2 1
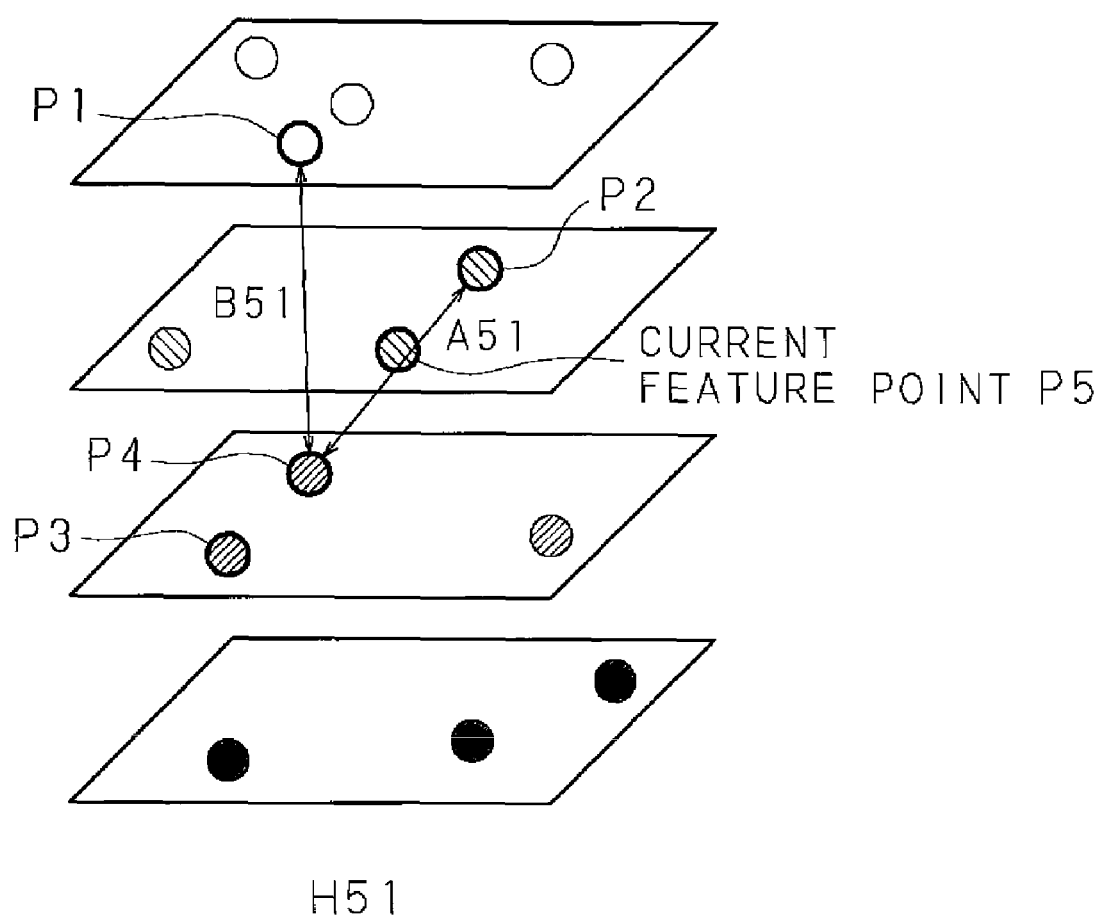

F I G. 2 2
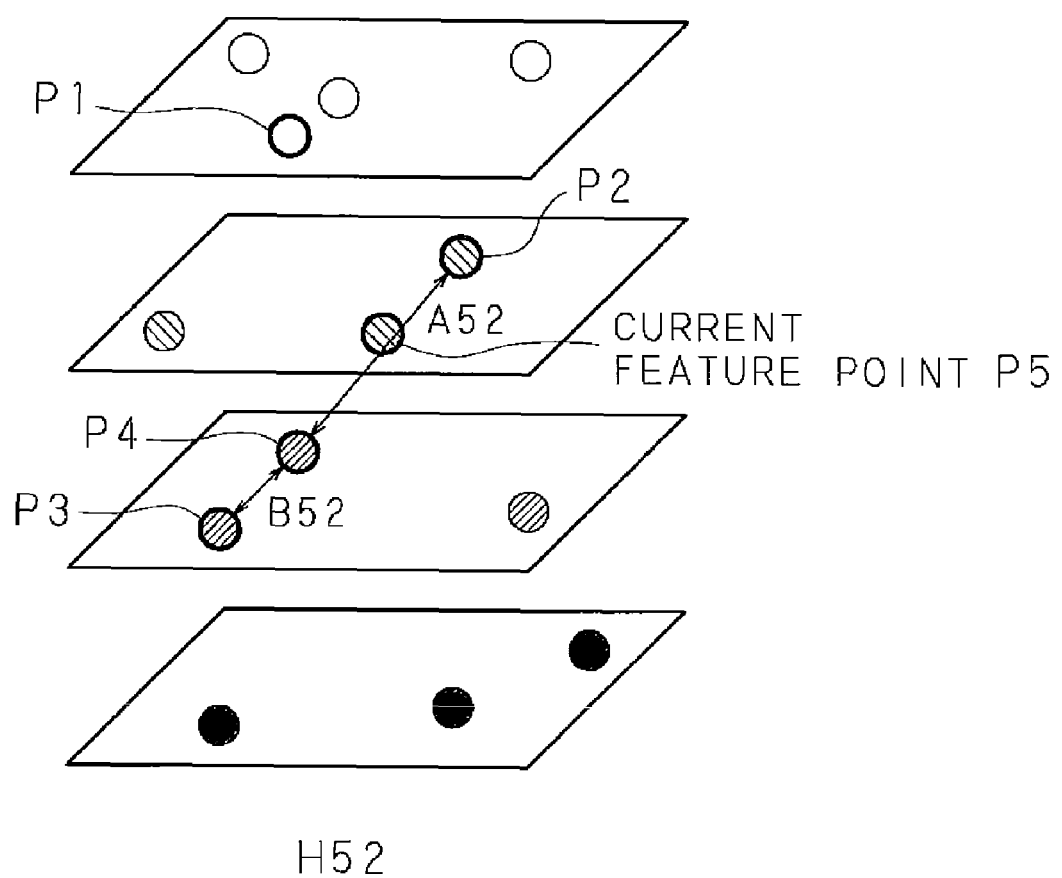

F I G. 24
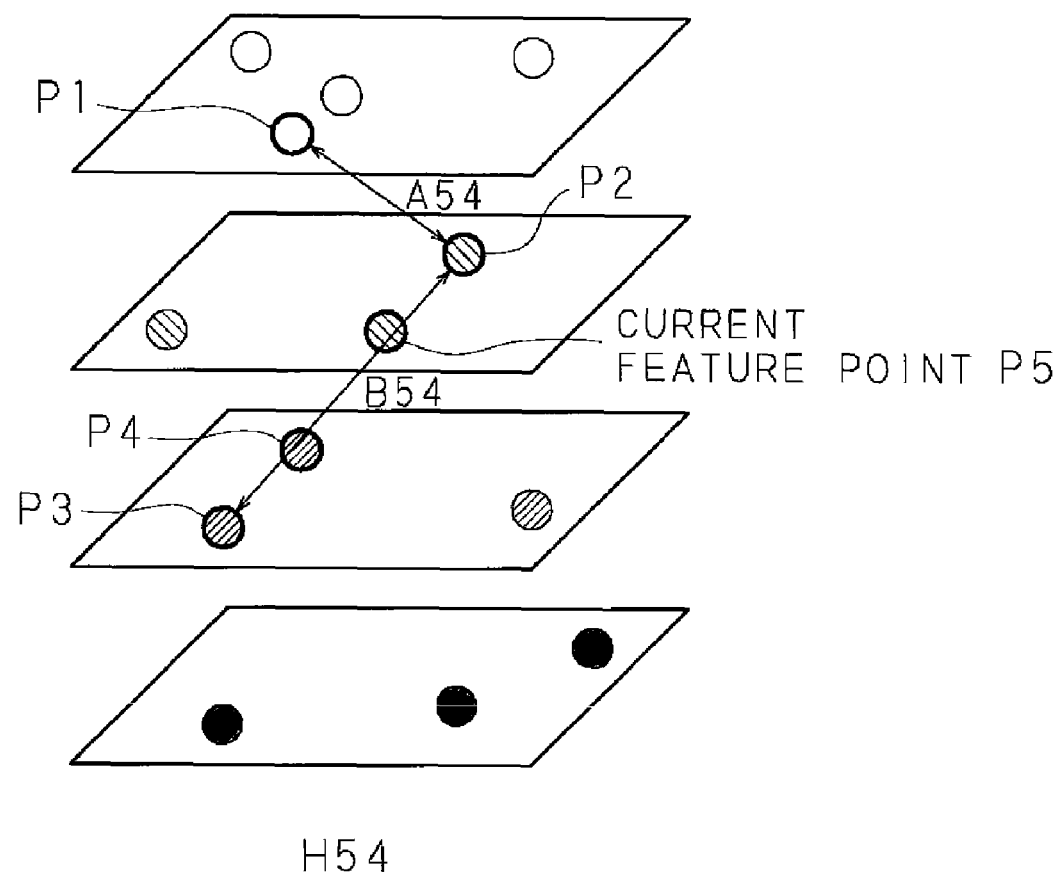

IMAGE PROCESSING METHOD, IMAGE PROCESSING APPARATUS, AND IMAGE FORMING APPARATUS

CROSS-REFERENCE TO RELATED APPLICATIONS

This Nonprovisional application claims priority under 35 U.S.C. §119(a) on Patent Application No. 2007-56291 filed in Japan on Mar. 6, 2007 and Patent Application No. 2008-40439 filed in Japan on Feb. 21, 2008, the entire contents of which are hereby incorporated by reference.

BACKGROUND OF THE INVENTION

The present invention relates to: an image processing method and an image processing apparatus each extracting features of a document image and determining, based on the extracted features, similarity between the document image and a reference image; and an image forming apparatus each including such an image processing apparatus.

Proposed methods for reading a document with a scanner, matching image data, obtained by reading the document, with image data stored in advance, and determining similarity between the images include: a method in which keywords are extracted from images by an OCR (Optical Character Reader), for example, and similarity of the images is determined based on the extracted keywords; and a method in which images, whose similarity is to be determined, are restricted to formatted images having ruled lines, and features of the ruled lines are extracted to determine similarity of the images.

However, in order to accurately determine image similarity in these determination processes, the skew or the like of a document to be read must be preliminarily corrected (i.e., skew correction must be performed), and there arises a problem that image similarity cannot be accurately determined if skew correction cannot be performed. Further, since a process performed in determining image similarity is complicated, it has been difficult to realize the process by hardware. If the similarity determination process is to be realized by a simple algorithm, the process can be easily realized by hardware; however, the determination accuracy cannot be improved, and furthermore, there arises a problem that the resistance to skew or disturbance such as noise becomes insufficient.

To cope with such problems, Non-Patent Document 1 (Tomohiro Nakai and three others, "Document Image Retrieval Based on Cross-Ratio and Hashing", Technical Report of the Institute of Electronics, Information and Communication Engineers, March 2005) discloses a document image similarity determination method capable of accurately determining similarity even if a document image is rotated, or even if data, which does not exist in a reference image, is written. In this method, a document image is binarized to calculate a connected component, the centroid of the connected component is determined as a feature point, surrounding feature points are extracted with respect to a certain feature point, a set of three feature points, for example, are selected from the extracted feature points to calculate the ratios of distances of the feature points, and then a hash value, serving as features, is calculated using a hash function or the like based on a plurality of the calculated ratios. This hash value is stored in a table in association with an index indicative of a document for each plurality of document formats (reference documents) in advance, and document image matching is carried out by voting for a document format corresponding to the hash value calculated from the read (read out) document image and by performing a threshold process on the number of obtained votes. Centroids, each calculated as a feature point, are unlikely to be susceptible to noise or the like, and even if the rotation, parallel movement or the like of a document has occurred, a relative positional relationship between centroids does not change; thus, a similarity determination process unsusceptible to disturbance can be realized by carrying out matching using features based on the ratios of the distances between centroids (feature points).

SUMMARY OF THE INVENTION

In the method according to Non-Patent Document 1, a document image is binarized so as to determine a connected component; therefore, in the case of a text document composed of characters, a connected component can be accurately determined, and the matching with a reference image can be accurately carried out. However, in the case of a photograph document such as a printing paper photograph in which a document image includes a printed photograph or a continuous tone region, the density value of the document image is distributed in a wide range; therefore, just a simple binarization of the document image causes problems that the connected component boundary becomes unclear, the connected component cannot be accurately determined, and the accuracy of matching with a reference image is reduced.

The present invention has been made in view of such circumstances, and its object is to provide: an image processing method and an image processing apparatus each capable of performing accurate matching even in the case of a photograph-containing document by generating, based on a pixel value of each pixel of a document image, a plurality of layer images having different pixel value ranges, extracting a feature point for each of the generated layer images, and calculating features (feature vectors e.g. hash value) of the document image based on the feature point extracted for each layer image; and an image forming apparatus each including such an image processing apparatus.

An image processing apparatus according to the present invention extracts features of a document image composed of a plurality of pixels, and for determining similarity between the document image and a reference image based on the extracted features, the apparatus including: storing means for storing features associated with each of a plurality of the reference images in advance; generating means for generating, based on a pixel value of each pixel of the document image, a plurality of layer images having different pixel value ranges; extracting means for performing a binarization process for each of the layer images generated by the generating means to extract a feature point; calculating means for calculating features of the document image based on the feature point extracted by the extracting means for each of the layer images; features determining means for determining whether the features, calculated by the calculating means, corresponds to the features associated with the reference image; voting means for voting for, when the features are determined to be corresponding to each other by the features determining means, the reference image associated with the features for each corresponding features; and similarity determining means for determining, based on the number of votes obtained by the voting of the voting means, whether the document image is similar to the reference image.

In the present invention, based on the pixel value of each pixel of a document image, a plurality of layer images having different pixel value ranges are generated. For example, if a density value (which may be a luminance value or an intensity value) of each pixel is adopted as a pixel value of each pixel of a document image, and the density value included in the document image is expressed by 256 levels of gray in the range of 0 to 255, for example, the document image is represented by separating it into four layers with different density value ranges, i.e., 0 to 63, 64 to 127, 128 to 193, and 194 to 255, thereby generating four layer images. A connected component (connected constituent) is determined based on a binarized image obtained by binarizing each of the generated layer images, and the centroid of the determined connected component is extracted as a feature point. The feature points extracted for each layer image are summed (i.e., the feature points extracted for each layer image are collected as feature points on the document image), and a plurality of feature points are selected from among the sum of the feature points, thereby calculating features (e.g., a hash value) as an invariant. It is determined whether the calculated features corresponds to features associated with each of a plurality of reference images (i.e., images to be matched with the document image to determine similarity therebetween) stored in advance. When it is determined that the features correspond to each other, voting is performed for the reference image associated with the features for each corresponding features. For example, when the number of votes obtained for a certain reference image is greater than a predetermined threshold value based on the number of votes obtained by the voting, it is determined that the document image is similar to the reference image, and when the number of the votes is smaller than the predetermined threshold value, it is determined that the document image is not similar to the reference image. In determining a connected component in order to obtain feature points, even if the document image is a pictorial image represented in a continuous tone, the separation of the document image into a plurality of layer images reduces the tone range for each layer image, further facilitates the determination of a connected component, and clearly defines the boundary of the connected component, thus enabling accurate feature point extraction, and improving the accuracy of matching with a reference image.

The image processing apparatus according to one embodiment of the present invention further includes area detecting means for determining, based on the pixel value of each pixel of the document image, whether at least a region of the document image is a text component or a pictorial component, wherein the generating means generates a plurality of layer images for the region determined as being a pictorial component by the area detecting means.

In the present invention, based on the pixel value of each pixel of the document image, it is determined whether at least a region of the document image is a text component or a pictorial component. A method for determining a region may be any method; for example, a process for expanding black pixels in the binarized image, obtained by binarizing the document image, is performed, thus determining black pixel portions (runs), and combining the determined runs into a single region. The size of a rectangle circumscribing the combined region is determined, and the image type of each rectangle region (e.g., whether it is a text component or a pictorial component) is determined from the size of each circumscribing rectangle. For the region determined as being a pictorial component, a plurality of layer images are generated. In other words, in the case of a document image in which a text component and a pictorial component are mixed, for a text component, a connected component is determined to extract a feature point without separating the document image into layer images, and features is calculated based on the extracted feature. On the other hand, for a pictorial component, the document image is separated into a plurality of layer images, a connected component is determined to extract a feature point for each layer image, and the feature points extracted for each layer image are summed. Thus, even in the case of a document image in which a text component and a pictorial component are mixed, the determination of a connected component is further facilitated, the boundary of the connected component is clearly defined to enable accurate feature point extraction, thus improving the accuracy of matching with a reference image.

In the image processing apparatus according to another embodiment of the present invention, the extracting means performs, for the region determined as being a text component by the area detecting means, a binarization process on the document image to extract a feature point, while the extracting means extracts, for the region determined as being a pictorial component by the area detecting means, a feature point for each of the layer images, and the calculating means calculates features of the document image based on the feature point extracted for each component.

In the present invention, for the region determined as being a text component, a binarization process is performed on the document image to extract a feature point. For the region determined as being a pictorial component, a feature point is extracted for each of the layer images. The feature points extracted for each of the text component and the pictorial component are summed to determine a feature point of one document image as a whole, and features of the document image is calculated based on the determined feature point. Thus, even in the case of a document image in which a text component and a pictorial component are mixed, feature point extraction can be accurately performed.

In the image processing apparatus according to still another embodiment of the present invention, the extracting means performs, for the region determined as being a text component by the area detecting means, a binarization process on the document image to extract a feature point, while the extracting means extracts, for the region determined as being a pictorial component by the area detecting means, a feature point for each of the layer images. The calculating means, the features determining means, and the voting means perform the respective processes for each component, the apparatus further includes summing means for summing the number of votes obtained by the voting of the voting means for each component, and the similarity determining means determines, based on the number of the obtained votes summed by the summing means, whether the document image is similar to the reference image.

Further, in the present invention, for the region determined as being a text component, a binarization process is performed on the document image to extract a feature point. For the region determined as being a pictorial component, a feature point is extracted for each of the layer images to sum the feature points extracted for the respective layer images. Based on the feature points for each of the text component and the pictorial component, features is calculated for each component, and it is determined whether the calculated features corresponds to the features associated with a reference image. When the features are determined to be corresponding to each other, voting is performed for the reference image associated with the features for each corresponding features, and the number of votes obtained by the voting is summed for each component. Based on the sum of the number of the obtained votes, it is determined whether the document image is similar to the reference image. Thus, even in the case of a document image in which a text component and a pictorial component are mixed, a voting process is performed for each component to enable accurate matching with a reference image. Furthermore, positional information can be determined for each of a text component and a pictorial component; therefore, if these pieces of information and reference images are stored in association with each other, and features extraction and voting are performed for each component, it is possible to determine whether the document image is similar to the reference image also with reference to these pieces of positional information.

In the image processing apparatus according to still yet another embodiment of the present invention, the extracting means performs, for the region determined as being a text component by the area detecting means, a binarization process on the document image to extract a feature point, while the extracting means extracts, for the region determined as being a pictorial component by the area detecting means, a feature point for each of the layer images. The calculating means, the features determining means, the voting means, and the similarity determining means perform the respective processes for each component, and the apparatus further includes a comprehensive determining means for determining, based on a result determined for each component by the similarity determining means, whether the document image is similar to the reference image.

In the present invention, for the region determined as being a text component, a binarization process is performed on the document image to extract a feature point. For the region determined as being a pictorial component, a feature point is extracted for each of the layer images to sum the feature points extracted for the respective layer images. Based on the feature points for each of the text component and the pictorial component, features is calculated for each component, and it is determined whether the calculated features corresponds to the features associated with a reference image. When the features are determined to be corresponding to each other, voting is performed for the reference image associated with the features for each corresponding features, and based on the number of votes obtained by the voting, whether the document image is similar to the reference image is determined for each component. Based on a result determined for each component, whether the document image is similar to the reference image is determined. Thus, even in the case of a document image in which a text component and a pictorial component are mixed, whether the document image is similar to the reference image is determined for each component, and based on this determination result, whether the document image is similar to the reference image is ultimately determined, thus enabling accurate matching with the reference image. Also in this case, similarly to the above, positional information can be determined for each of a text component and a pictorial component; therefore, if these pieces of information and reference images are stored in association with each other, and features extraction and voting are performed for each component, it is possible to determine whether the document image is similar to the reference image also with reference to these pieces of positional information. Moreover, the determination results for the text component and the pictorial component may be assigned weights for further determination. For example, the ratio between the text component and the pictorial component may be determined, and this ratio may be used as the proportions thereof.

In the image processing apparatus according to another embodiment of the present invention, the extracting means extracts, for the region determined as being a pictorial component by the area detecting means, a feature point from the plurality of layer images, and the calculating means calculates features of the document image based on the feature point extracted by the extracting means.

In the present invention, for the region determined as being a pictorial component, a feature point is extracted from each of the plurality of layer images (layers), and features of the document image is calculated based on the extracted feature point. For example, surrounding feature points located close to a current feature point, which include not only one located in a layer in which the current feature point exists but also one located in an adjacent layer, are extracted to calculate features. Thus, the accuracy of document image matching can be further improved since the features may differ in different layers even if the features are the same on the same layer.

An image forming apparatus according to the present invention includes: one of the above-described image processing apparatuses; and an image output apparatus for forming an image processed by the image processing apparatus.

A computer program according to the present invention causes a computer to extract features of a document image composed of a plurality of pixels, and to determine similarity between the document image and a reference image based on the extracted features, wherein the computer program causes the computer to function as: means for generating, based on a pixel value of each pixel of the document image, a plurality of layer images having different pixel value ranges; means for performing a binarization process on each of the generated layer images to extract a feature point; means for calculating features of the document image based on the feature point extracted for each of the layer images; means for determining whether the calculated features corresponds to the features associated with the reference image; means for voting for, when the features are determined to be corresponding to each other, the reference image associated with the features for each corresponding features; and means for determining, based on the number of votes obtained by the voting, whether the document image is similar to the reference image.

A computer-readable memory product according to the present invention stores the above-described computer program.

In the present invention, even if a document image is a pictorial image represented in a continuous tone, the tone range is reduced for each layer image to further facilitate the determination of a connected component, and the boundary of the connected component can be clearly defined to enable accurate feature point extraction, thus improving the accuracy of matching with a reference image. Furthermore, even in the case of a document image in which a text component and a pictorial component are mixed, the document image can be accurately matched with a reference image.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory diagram showing an example of a feature point of a connected component;

FIG. 5 is an explanatory diagram showing an example of a result of extraction of feature points for a character string.

FIGS. 9A to 9C are explanatory diagrams showing examples of calculation of invariants with respect to a current feature point;

FIGS. 10A to 10C are explanatory diagrams showing other examples of calculation of invariants with respect to a current feature point;

FIGS. 13A and 13B are explanatory diagrams each showing a structure of a hash table;

FIG. 21 is an explanatory diagram showing an example of calculation of an invariant with respect to a current feature point;

FIG. 22 is an explanatory diagram showing another example of calculation of an invariant with respect to a current feature point;

FIG. 24 is an explanatory diagram showing still yet another example of calculation of an invariant with respect to a current feature point;

DETAILED DESCRIPTION OF THE INVENTION

Hereinafter, the present invention will be described with reference to the drawings illustrating embodiments thereof.

Embodiment 1

Figure 1:
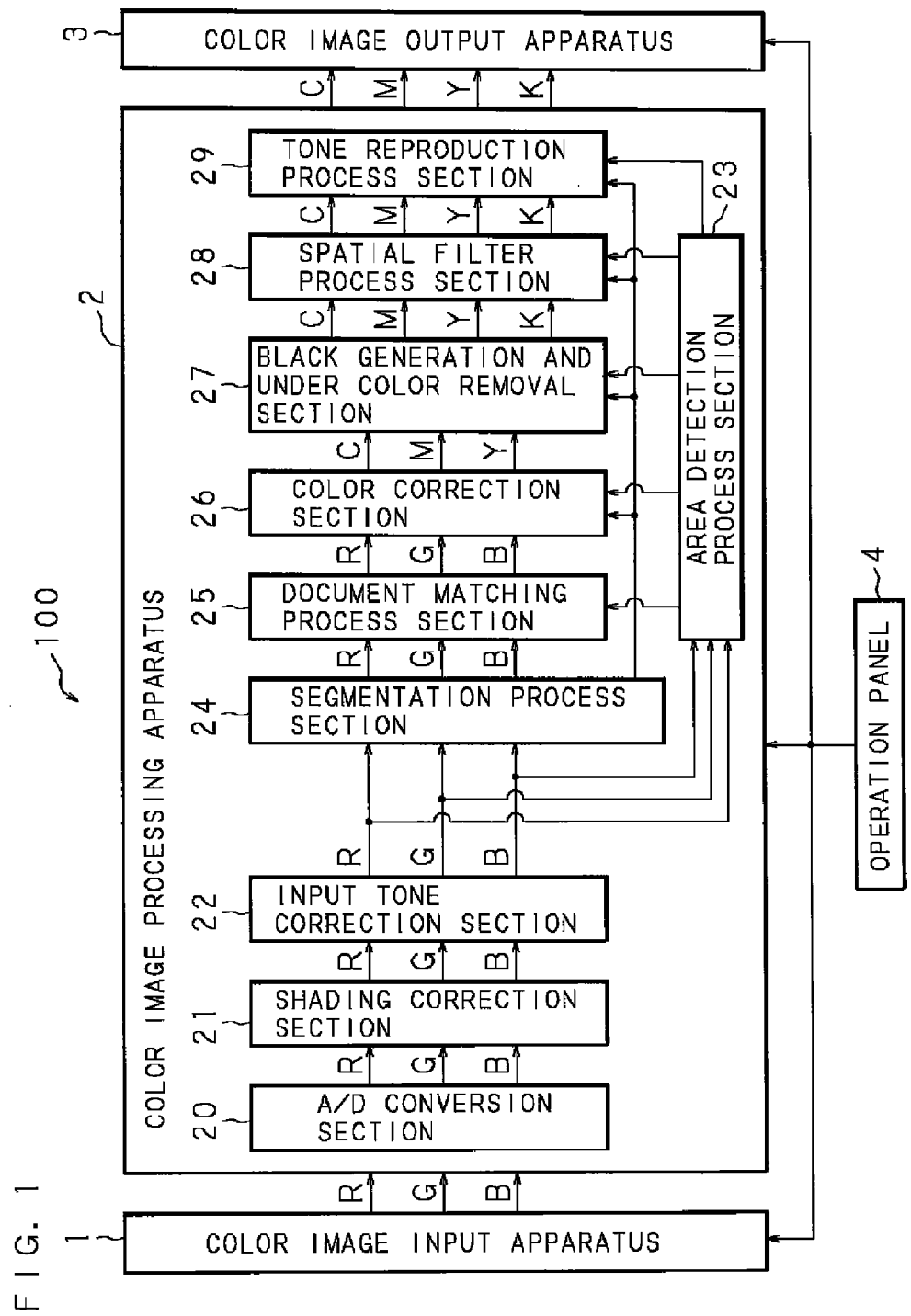
FIG. 1 is a block diagram showing a configuration of an image forming apparatus employing an image processing apparatus according to the present invention.

FIG. 1 is a block diagram showing a configuration of an image forming apparatus 100 employing an image processing apparatus according to the present invention. The image forming apparatus 100 (e.g., a digital color copying machine or a multi-function peripheral provided with combined functions such as a printer function, a filing function, and a facsimile or e-mail distribution function) includes: a color image input apparatus 1; a color image processing apparatus 2 (image processing apparatus); a color image output apparatus 3; and an operation panel 4 for performing various kinds of operations. Image data of analog signals of RGB (R: red, G: green, B: blue), obtained by reading a document into (or reading a document with) the color image input apparatus 1, is outputted to the color image processing apparatus 2, subjected to predetermined processes in the color image processing apparatus 2, and then outputted to the color image output apparatus 3 as digital color signals of CMYK (C: cyan, M: magenta, Y: yellow, K: black).

The color image input apparatus 1 is, for example, a scanner provided with a CCD (Charged Coupled Device). The color image input apparatus 1 reads a reflected light image from a document image in the form of analog signals of RGB, and outputs the read RGB signals to the color image processing apparatus 2. Further, the color image output apparatus 3 is a printer employing, for example, an electrophotography method or an inkjet method for outputting the image data of the document image onto a record paper sheet. Alternatively, the color image output apparatus 3 may be a display unit such as a display.

The color image processing apparatus 2 is provided with respective processing sections described below, and includes an ASIC (Application Specific Integrated Circuit) and the like.

An A/D conversion section 20 converts the RGB signals, inputted from the color image input apparatus 1, into 10-bit digital signals, for example, and outputs the converted RGB signals to a shading correction section 21. The shading correction section 21 performs a correction process for removing, from the inputted RGB signals, various kinds of distortions generated in the illumination system, the image focusing system, the image sensing system and the like of the color image input apparatus 1, and then outputs the corrected RGB signals to an input tone correction section 22.

The input tone correction section 22 performs a process for adjusting the color balance on the inputted RGB signals (RGB reflectivity signals), and performs image quality adjustment processing such as page background density removing or contrast. Further, the input tone correction section 22 performs a process for converting the signals into ones such as density (pixel value) signals easily processable by the image processing system adopted in the color image processing apparatus 2, and then outputs the converted RGB signals to an area detection process section 23 and a segmentation process section 24.

The area detection process section 23 includes processing sections such as: a binarization process section; a run expansion process section; a labeling process section; a circumscribing rectangle extraction process section; and a determination section (all of which are not shown). The area detection process section 23 performs a binarization process on inputted image data to generate a binarized image. The area detection process section 23 performs a process for expanding black pixels in the binarized image by the run expansion process section to determine a black pixel portion (run), and then outputs a run expansion signal to the labeling process section. The run expansion signal, outputted from the run expansion process section, is inputted to the labeling process section, and the labeling process section combines (labels) connected runs into a single region based on the run expansion signal, thus outputting a signal, indicative of a feature of the combined region, to the circumscribing rectangle process section.

The area detection process section 23 determines the size of a rectangle circumscribing each labeled region by the circumscribing rectangle process section, and outputs the result to the determination section. The area detection process section 23 determines, from the size of each circumscribing rectangle, the image type of each rectangle region, e.g., whether it is a text component or a pictorial component, by the determination section, and outputs an area detection signal indicative of the determination result to a document matching process section 25 or the like. The pictorial component (region) determined by the area detection process section 23 includes halftone image and continuous tone image.

It should be noted that the area detection process section 23 also determines the presence or absence of a page background component when determining a pictorial component. For example, the area detection process section 23 further determines, for the region determined as being a pictorial component, the presence or absence of a page background component based on histogram information. For example, in a density region having a density value at or above the minimum value which is determined as being page background, a region having the number of pixels at or above the minimum value, which is determined as being page background, can be determined as being a page background component. A page background removal process can be performed on the region determined as being a page background component. It should be noted that the determination result is outputted as an area detection signal. Furthermore, a value by which a page background component is properly determined using various image samples can be appropriately set for the minimum density value, which is determined as being a page background component, and the minimum number of pixels, which is determined as being a page background component.

Based on the inputted RGB signals, the segmentation process section 24 separates respective pixels of the inputted image into a text component, a halftone component, and a photograph (continuous tone) component. Based on the segmentation result, the segmentation process section 24 outputs a segmentation class signal, indicating that each pixel belongs to which region (component), to a color correction section 26, a black generation and under color removal section 27, a spatial filter process section 28, and a tone reproduction process section 29. Further, the segmentation process section 24 outputs the inputted RGB signals intact to the subsequent document matching process section 25. It should be noted that the segmentation process section 24 and the area detection process section 23 may be combined with each other, or the color image processing apparatus 2 may be configured so that the area detection process section 23 is provided instead of the segmentation process section 24.

The document matching process section 25 binarizes the inputted image, calculates feature points of a connected component determined based on the binary image, and then determines, using the calculated result, similarity between the inputted image (document image) and a reference image (including a text image) stored in advance. When it is determined that the images are similar, the document matching process section 25 outputs a classification signal that determines a preset process for a similar document, thus carrying out a predetermined process. For example, when it is determined that the inputted image is a similar document, the document matching process section 25 performs processes such as cancellation of output of this document, inhibition of copying of this document, and filing of this document in a predetermined folder. Thus, in addition to matching of images (including a text image), processes associated with the matching result can be performed. Further, the document matching process section 25 outputs the inputted RGB signals intact to the subsequent color correction section 26.

It should be noted that "document image", for example, refers to: a document image obtained by reading a document image with a scanner; a document image in the form of electronic data generated by writing necessary information into data of a predetermined format using a computer; electronic data generated by converting data read with a scanner into a predetermined file format such as JPEG; and the like.

The color correction section 26 converts the inputted RGB signals into the color space of CMY, performs color correction in accordance with the characteristics of the color image output apparatus 3, and then outputs the corrected CMY signals to the black generation and under color removal section 27. Specifically, for the purpose of high fidelity in color reproduction, the color correction section 26 performs a process for removing color impurity based on the spectral characteristics of the CMY color materials containing unnecessary absorption components.

Based on the CMY signals inputted from the color correction section 26, the black generation and under color removal section 27 generates a K (black) signal and, at the same time, subtracts the K signal from the inputted CMY signals so as to generate new CMY signals, and then outputs the generated CMYK signals to the spatial filter process section 28. An example of a process in the black generation and under color removal section 27 is described below. For example, in the case of the process for performing black generation by using skeleton black, the input-output characteristics of the skeleton curve is expressed by $y=f(x)$, input data is denoted by C, M, and Y, output data is denoted by C', M', Y', and K', and the UCR (Under Color Removal) ratio is denoted by $\alpha(0<\alpha<1)$. Then, data outputted by the black generation and under color removal process is expressed by $K'=f\{\min(C,M,Y)\}$, $C'=C-\alpha K'$, $M'=M-\alpha K'$, and $Y'=Y-\alpha K'$.

The spatial filter process section 28 performs a spatial filtering process on the CMYK signals, inputted from the black generation and under color removal section 27, by means of a digital filter based on the segmentation class signal. Thus, the spatial frequency characteristics of the image data are corrected so that blur occurrence or graininess degradation of the output image is prevented in the color image output apparatus 3. For example, in order to improve the reproducibility of, especially, black characters (texts) or color characters, the spatial filter process section 28 performs an edge enhancement process so as to emphasize high frequency components for the region separated into a text component by the segmentation process section 24. Further, on the region separated into a halftone component by the segmentation process section 24, the spatial filter process section 28 performs a low pass filtering process for removing the input halftone components. The spatial filter process section 28 outputs the processed CMYK signals to the tone reproduction process section 29.

Based on the segmentation class signal inputted from the segmentation process section 24, the tone reproduction process section 29 performs a predetermined process on the CMYK signals inputted from the spatial filter process section 28. For example, in order to improve the reproducibility of, especially, black characters or color characters, the tone reproduction process section 29 performs a binarization process or a multi-level dithering process on the region separated into a text component, such that the signals should become appropriate for the reproduction of high frequency components in the color image output apparatus 3. Further, the tone reproduction process section 29 performs a tone reproduction process (halftone generation) on the region separated into a halftone component by the segmentation process section 24, such that the image is ultimately separated into pixels to enable the reproduction of each tone. Furthermore, the tone reproduction process section 29 performs a binarization process or a multi-level dithering process on the region separated into a photograph component by the segmentation process section 24, such that the signals should become appropriate for the tone reproduction in the color image output apparatus 3.

The operation panel 4 includes, for example, a touch panel that is integrally formed with: a display section such as a liquid crystal display; and an operation section including a setting button and the like, and based on information inputted from the operation panel 4, the operations of the color image input apparatus 1, the color image processing apparatus 2 and the color image output apparatus 3 are controlled. It should be noted that the respective processes described above are controlled by a CPU (Central Processing Unit: control means), which is not shown.

The color image processing apparatus 2 temporarily stores the image data (CMYK signals), processed by the tone reproduction process section 29, in a storage section (not shown). Then, at a predetermined timing of performing image formation, the color image processing apparatus 2 reads the image data stored in the storage section, and outputs the read image data to the color image output apparatus 3. Control for these is performed, for example, by a CPU (not shown).

Figure 2:
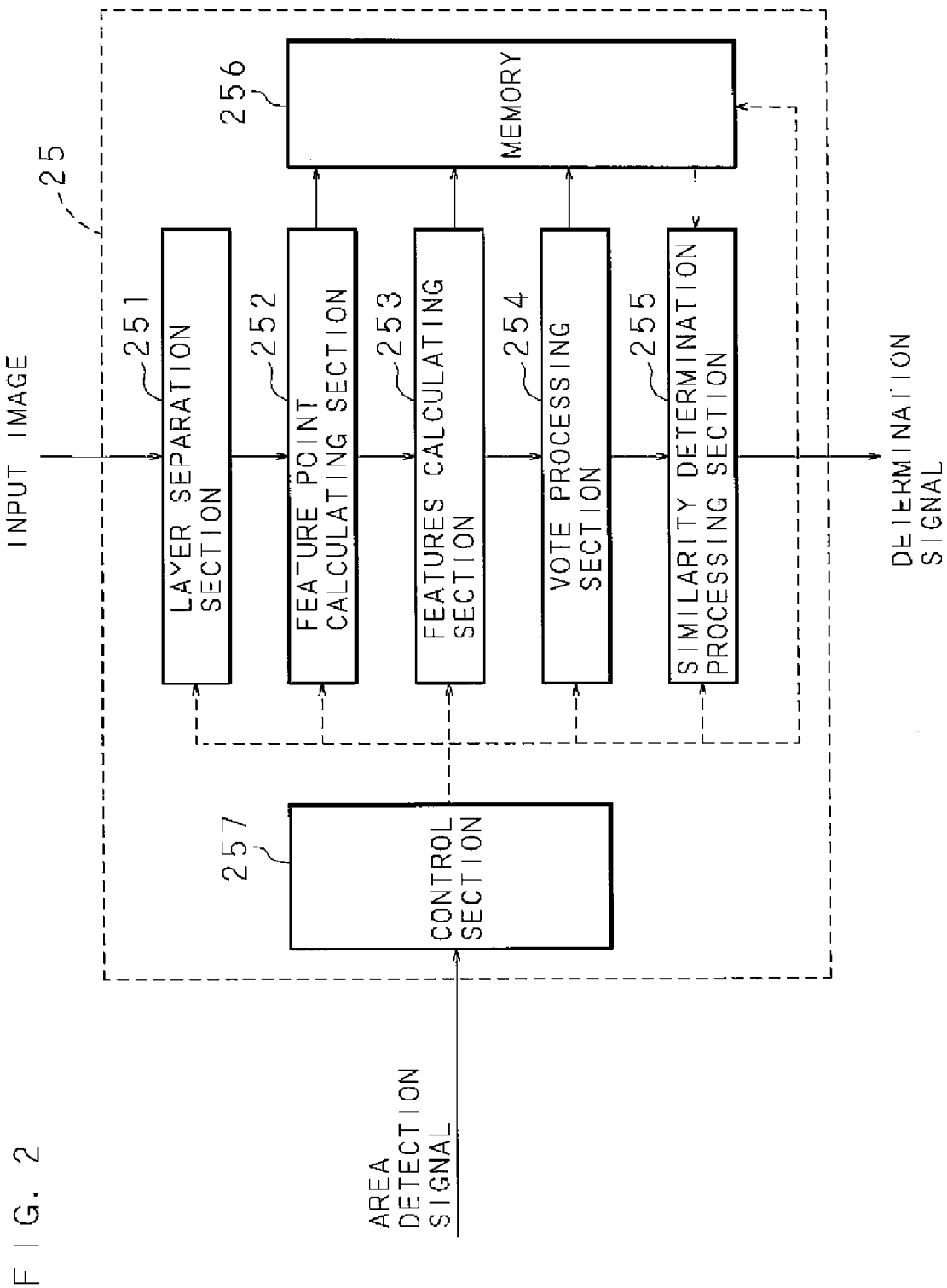
FIG. 2 is a block diagram showing a configuration of a document matching process section.

FIG. 2 is a block diagram showing a configuration of the document matching process section 25. The document matching process section 25 includes: a layer separation section 251; a feature point calculating section 252; a features calculating section 253; a vote processing section 254; a similarity determination processing section 255; a memory 256; and a control section 257 for controlling the respective sections.

In accordance with the control of the control section 257 performed based on an area detection signal inputted to the control section 257, the layer separation section 251 outputs, among inputted images (document images), a document image having a region determined as a text component to the subsequent feature point calculating section 252. Further, among the inputted images (document images), if a density value (which may be a luminance value, an intensity value or the like) of each pixel in the document image having a region determined as a pictorial component is expressed by 256 levels of gray in the range of 0 to 255, for example, the layer separation section 251 represents the document image by separating it into four layers with different density value ranges, i.e., 0 to 63, 64 to 127, 128 to 193, and 194 to 255. Thus, the layer separation section 251 generates four layers (layer images), and outputs the generated layer images to the feature point calculating section 252. It should be noted that the number of layers to be separated is not limited to four, but may be any other number.

The feature point calculating section 252 performs aftermentioned predetermined processes on the inputted image (e.g., the image determined as being a text component, or a plurality of layer images determined as being a pictorial component). And at the same time, the feature point calculating section 252 binarizes the inputted image, extracts (calculates) a feature point (e.g., a value obtained by accumulating the coordinate values of the respective pixels constituting a connected component in the binary image and by dividing the accumulated coordinate values by the number of pixels contained in the connected component) of the connected component determined based on the binary image, and then outputs the extracted feature point to the features calculating section 253. It should be noted that the feature point calculating section 252 performs feature point extraction for a region determined as being a text component and a pictorial component, but does not perform feature point extraction for a region determined as being a page background component.

Figure 3:
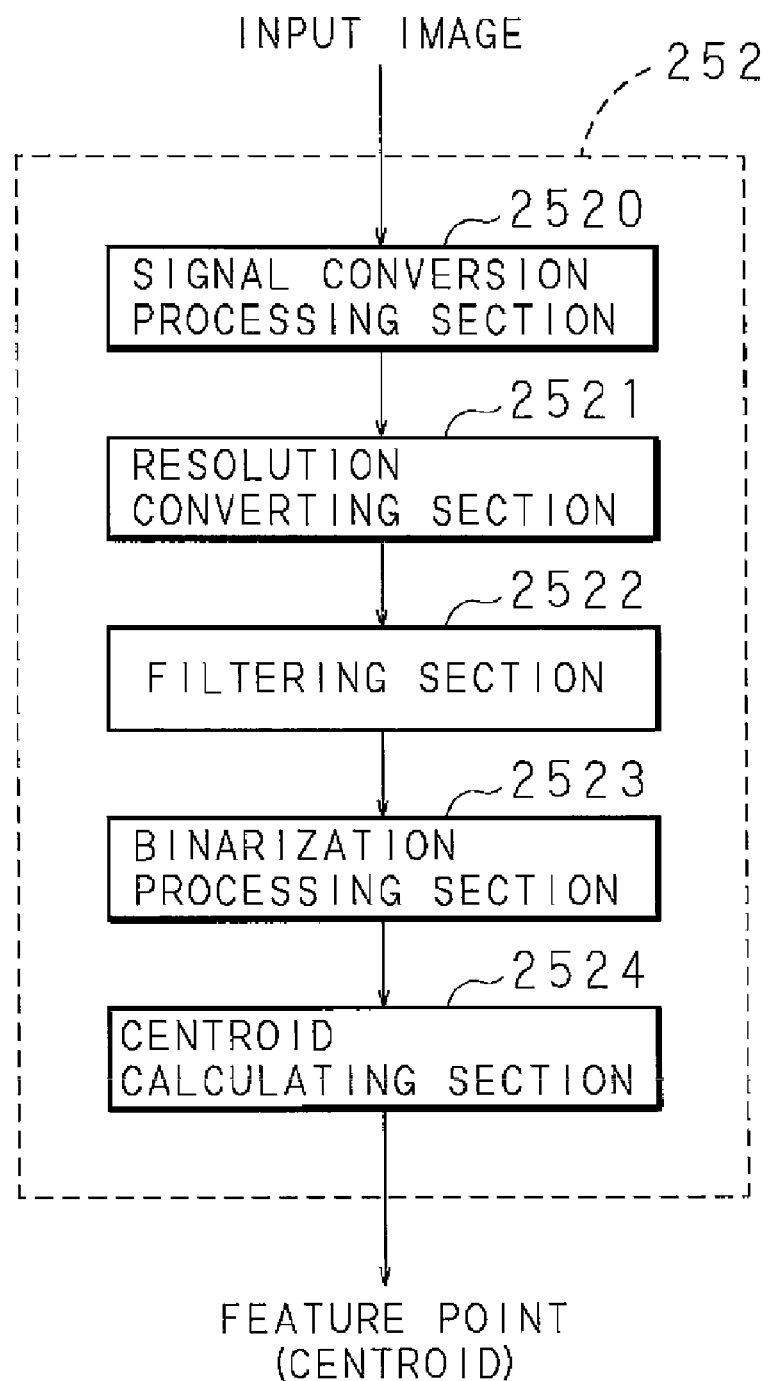
FIG. 3 is a block diagram showing a configuration of a feature point calculating section.

FIG. 3 is a block diagram showing a configuration of the feature point calculating section 252. The feature point calculating section 252 includes: a signal conversion processing section 2520; a resolution converting section 2521; a filtering section 2522; a binarization processing section 2523; and a centroid calculating section 2524.

When the inputted image is a color image, the signal conversion processing section 2520 achromatizes the color image, converts it into a luminance signal or a lightness signal, and then outputs the converted image to the resolution converting section 2521. For example, the luminance signal Y can be represented by the following formula: $Yj=0.30 \times Rj + 0.59 \times Gj + 0.11 \times Bj$, where the color components RGB of each pixel are $Rj$, $Gj$, and $Bj$, respectively, and the luminance signal of each pixel is $Yj$. It should be noted that the present invention is not limited to this formula, and the RGB signals may be converted into CIE1976 $L^*a^*b^*$ signals.

Even when the inputted image is one having undergone optical magnification change in the color image input apparatus 1, the resolution converting section 2521 performs magnification change on the inputted image again so as to realize a predetermined resolution, and then outputs the image, having undergone the magnification change, to the filtering section 2522. Thus, even when a magnification change process has been performed by the color image input apparatus 1 to vary the resolution, feature point extraction is achieved free from its influence, thereby making it possible to accurately determine image similarity. In particular, in the case of size-reduced characters, for example, it is possible to exclude the possibility that, when a connected component is to be specified by performing a binarization process, blotted characters cause intrinsically separated regions to be specified as if they are connected to each other, which might deviate the calculated centroid. Further, the resolution converting section 2521 converts the image into one with a resolution smaller than the resolution obtained when the image is read by the color image input apparatus 1 with unity magnification. For example, an image read at 600 dpi (dot per inch) by the color image input apparatus 1 is converted into one with 300 dpi. This can reduce the throughput in the subsequent stage.

The filtering section 2522 corrects the spatial frequency characteristics of the inputted image (e.g., an enhancement process and a smoothing process for the image), and outputs the corrected image to the binarization processing section 2523. Since the spatial frequency characteristics of the color image input apparatus 1 are different depending on each model, the filtering section 2522 corrects the different spatial frequency characteristics into required characteristics. In the image (e.g., image signal) outputted from the color image input apparatus 1, degradation such as blurring in the image is caused by, for example: optical system components such as lenses and mirrors; the aperture ratio, the transfer efficiency, and the after-image of the light acceptance surface of CCD; and the storage effect and the scanning unevenness due to the physical scan. The filtering section 2522 performs an enhancement process on the boundary or the edges, thus remedying degradation such as blurring generated in the image. Further, the filtering section 2522 performs a smoothing process for suppressing high frequency components unnecessary in the feature point extracting process performed in the subsequent stage. This permits accurate feature point extraction, and as a result, the image similarity can be accurately determined.

The binarization processing section 2523 compares the density value, the luminance value (luminance signal) or the lightness value (lightness signal) of the inputted image with a threshold value to binarize the image, and then outputs the binary image, having undergone the binarization, to the centroid calculating section 2524.

Based on the binarization information (e.g., represented by "1" and "0") of each pixel of the binary image inputted from the binarization processing section 2523, the centroid calculating section 2524 performs labeling (label attaching process) on each pixel. The centroid calculating section 2524 determines a connected component where pixels having the same label are in succession, extracts as a feature point the centroid of the specified connected component, and then outputs the extracted feature point to the features calculating section 253. It should be noted that the feature point can be represented by the coordinate values (x, y coordinates) in the binary image.

FIG. 4 is an explanatory diagram showing an example of a feature point of a connected component. In this diagram, the specified connected component is a character "A", and is specified as a set of pixels to which the same label is imparted. A feature point (centroid) of this character "A" is located at a position (x, y coordinates) indicated by a black dot in the diagram. FIG. 5 is an explanatory diagram showing an example of a result of extraction of feature points for a character string. In the case of a character string composed of a plurality of characters, a plurality of feature points, having different coordinates depending on the kinds of characters, are extracted.

Figure 6A:
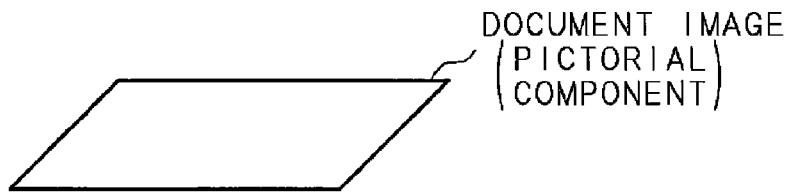
FIGS. 6A to 6D are explanatory diagrams showing examples of feature points of a photograph component.
Figure 6B:
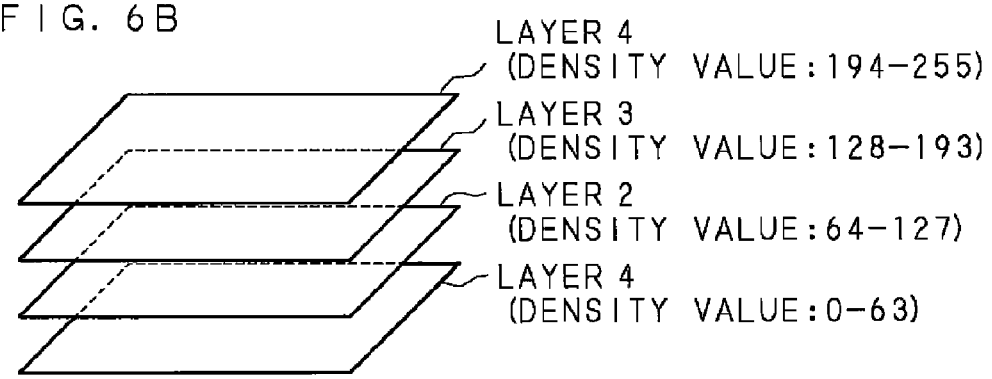
Figure 6C:
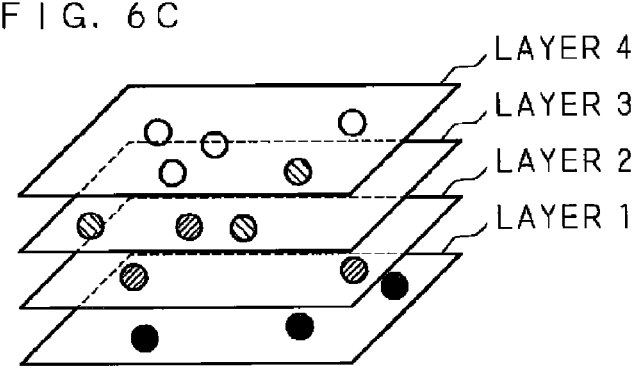
Figure 6D:
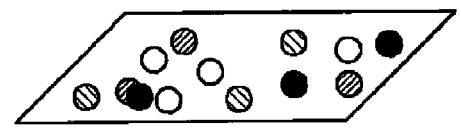

FIGS. 6A to 6D are explanatory diagrams showing examples of feature points of a photograph component. A document image, determined as being a photograph component as shown in FIG. 6A, is separated into four layers (layer images) 1 to 4, for example, based on the density value of the image as shown in FIG. 6B. The layer 1 has a density value in the range of 0 to 63, the layer 2 has a density value in the range of 64 to 127, the layer 3 has a density value in the range of 128 to 193, and the layer 4 has a density value in the range of 194 to 255. As shown in FIG. 6C, a feature point is extracted for each of the layers 1 to 4. As shown in FIG. 6D, the feature points extracted for the respective layers 1 to 4 are summed (i.e., the feature points extracted for each layer are collected as feature points on the document image), thus extracting these feature points as feature points of the document image. Even if the document image is a photograph image represented in a continuous tone, the separation of the document image into a plurality of layers (layer images) according to the density value ranges reduces the range (tone range) of the density value included in one layer (layer image), further facilitates the determination of a connected component, and clearly defines the boundary of the connected component to enable accurate feature point extraction.

It should be noted that when a document image is separated into layers, the density values of the document image do not necessarily have to be equally separated as in the above-described manner, but alternatively, the density value ranges by which layers are separated may be appropriately varied and set in accordance with a density histogram of the document image.

Figure 7:
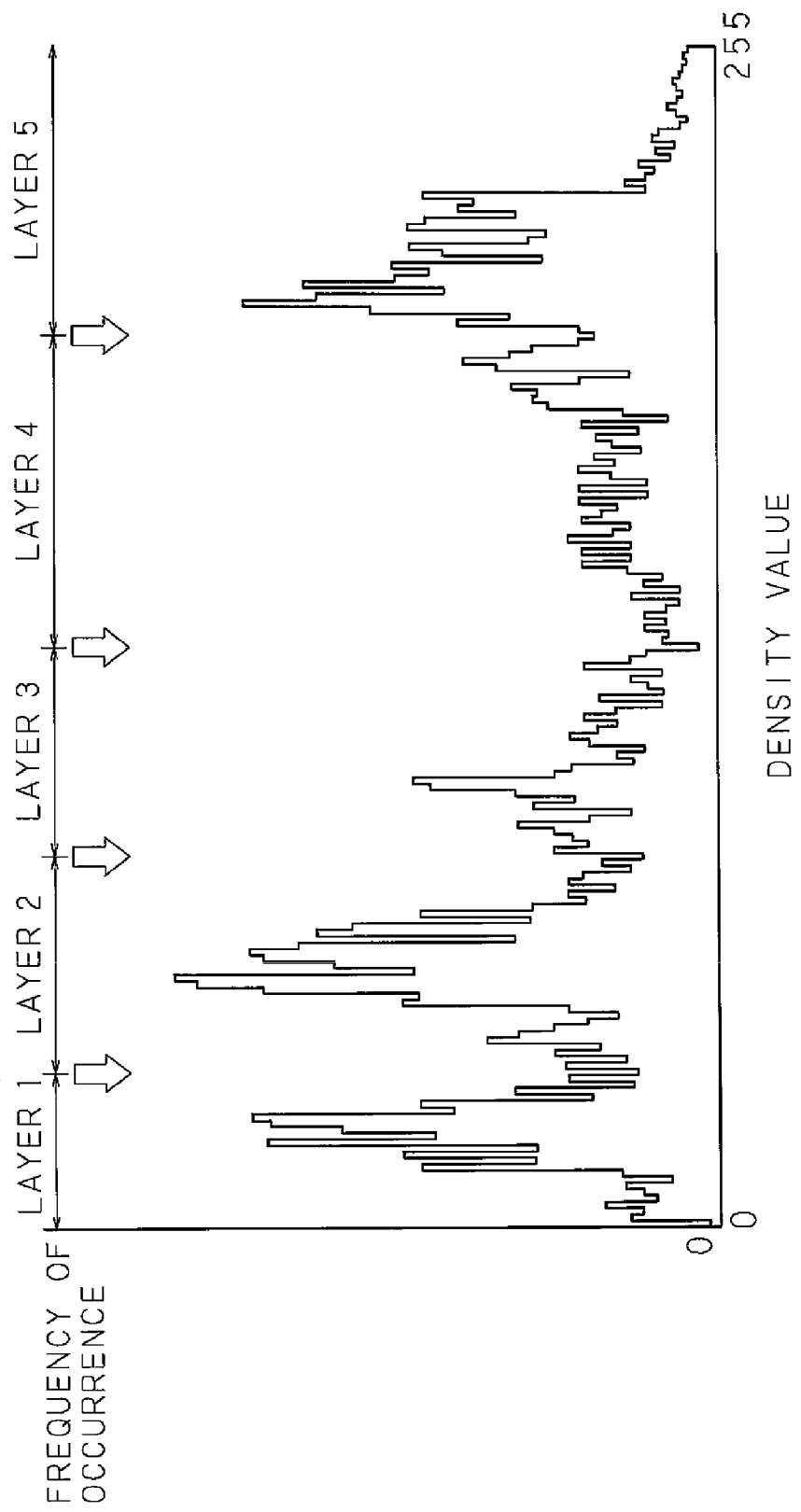
FIG. 7 is an explanatory diagram showing an example of a layer separation method.

FIG. 7 is an explanatory diagram showing another example of a layer separation method. In FIG. 7, the horizontal axis indicates a density value while the vertical axis indicates the frequency of occurrence, and there is shown a density histogram of a certain document image. As shown in this diagram, it is possible to set a density range by which the document image is separated into layers at each point (indicated by the arrow) at which the density value is minimized. Thus, regardless of the density distribution of a document image, a connected component can be specified more accurately by each layer, thereby improving the accuracy of feature point extraction.

The feature point calculating section 252 sums feature points extracted for each text component and pictorial component, and outputs the sum of the feature points to the features calculating section 253. The features calculating section 253 adopts, as a current feature point, each feature point (that is, coordinate values of the centroid of the connected component) inputted from the feature point calculating section 252, and then extracts, for example, other four surrounding feature points having smaller distances from the current feature point.

Figure 8:
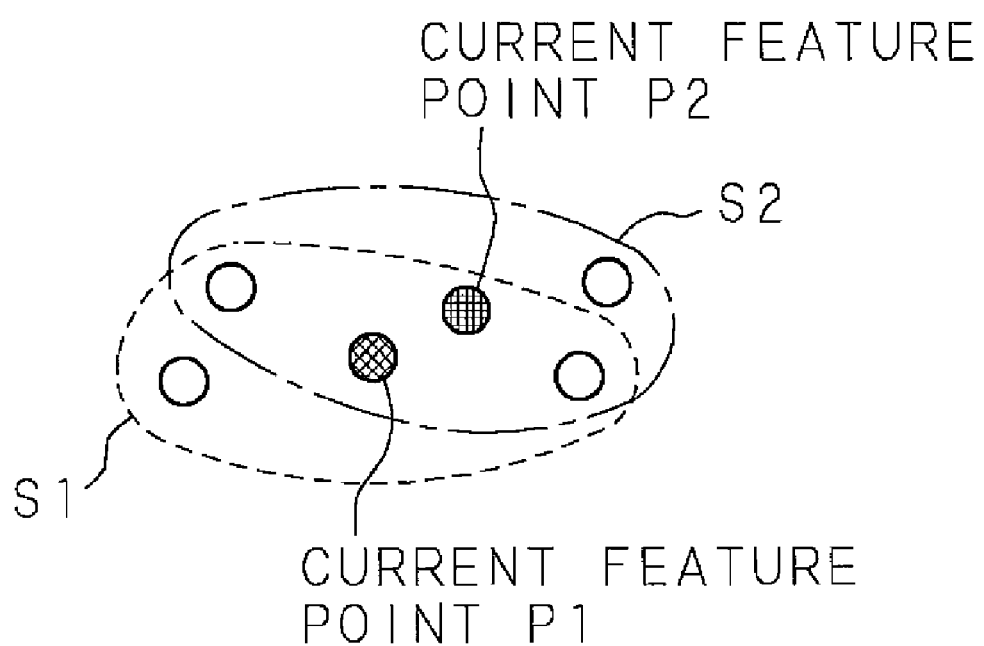
FIG. 8 is an explanatory diagram showing current feature points and surrounding feature points.
Figure 11A:
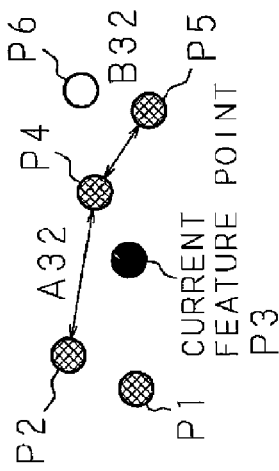
FIGS. 11A to 11D are explanatory diagrams showing still other examples of calculation of invariants with respect to a current feature point.
Figure 11B:
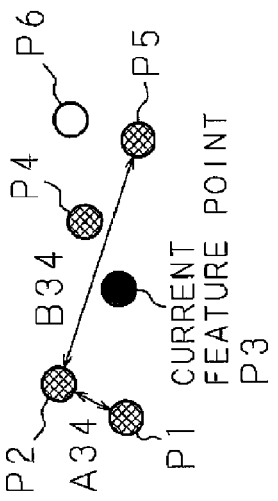
Figure 11C:
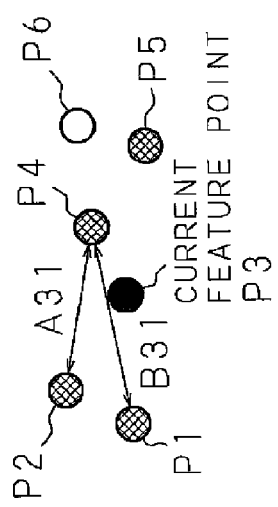
Figure 11D:
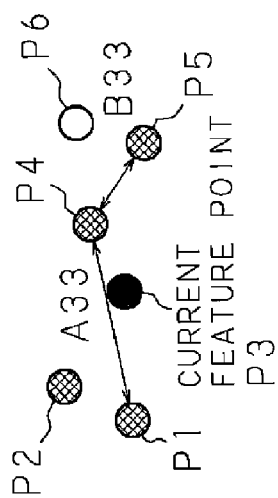
Figure 12A:
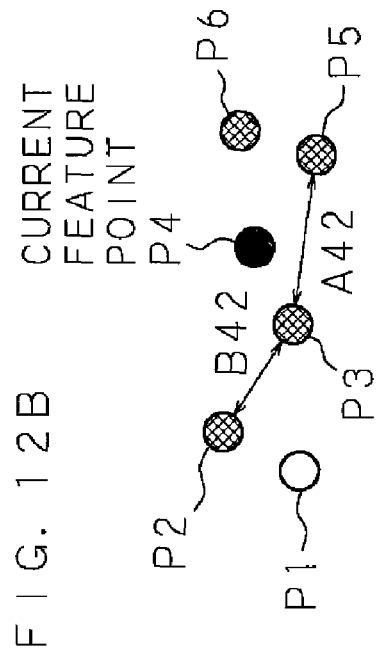
FIGS. 12A to 12D are explanatory diagrams showing still yet other examples of calculation of invariants with respect to a current feature point.
Figure 12B:
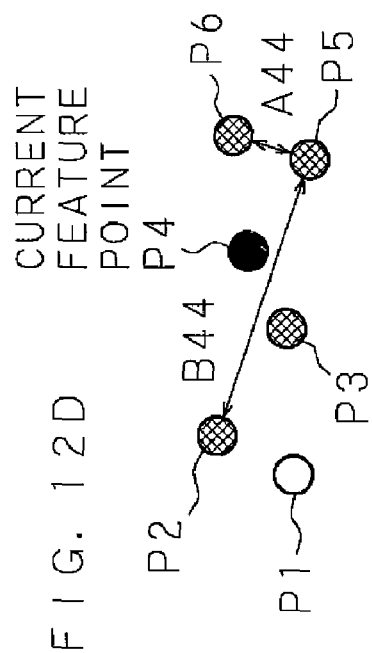
Figure 12C:
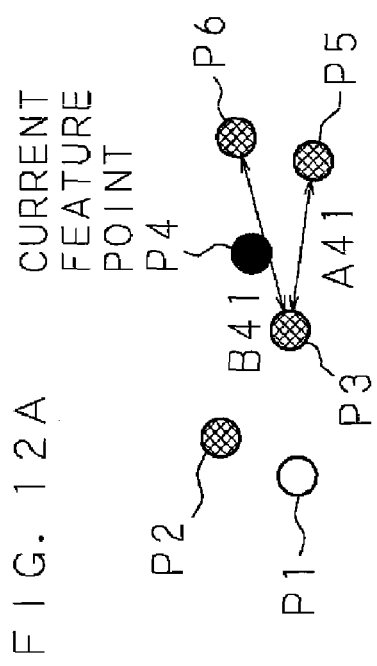
Figure 12D:
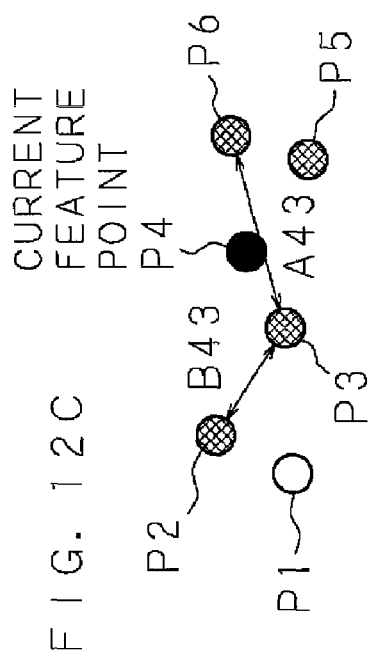

FIG. 8 is an explanatory diagram showing current feature points and surrounding feature points. As shown in this diagram, for example, four feature points surrounded by a closed curve S1 are extracted with respect to a current feature point P1 in ascending order of the distance from the current feature point P1 (with respect to the current feature point P1, a current feature point P2 is also extracted as one feature point). Further, with respect to the current feature point P2, for example, four feature points surrounded by a closed curve S2 are extracted in ascending order of the distance from the current feature point P2, in the same manner as described above (with respect to the current feature point P2, the current feature point P1 is also extracted as one feature point).

The features calculating section 253 selects three feature points from among the four extracted feature points so as to calculate an invariant. It should be noted that the number of feature points to be selected is not limited to three, but, for example, four or five feature points may be selected. The number of feature points to be selected differs depending on the kind of desired invariant. For example, an invariant calculated from three points is a similarity invariant.

FIGS. 9A to 9D are explanatory diagrams showing examples of calculation of invariants with respect to the current feature point P1, and FIGS. 10A to 10D are explanatory diagrams showing other examples of calculation of invariants with respect to the current feature point P2. As shown in FIGS. 9A to 9C, three feature points are selected from the four feature points surrounding the current feature point P1, and three kinds of invariants are denoted respectively by H1$j$ ($j$=1, 2, 3). Each invariant H1$j$ is calculated by the following formula: H1$j$=A1$j$/B1$j$. In this formula, A1$j$ and B1$j$ each indicate the distance between feature points, and the distance between the feature points is calculated based on the coordinate values of respective surrounding feature points. Thus, for example, even when the document is rotated, moved, or inclined, the invariant H1$j$ does not change, and image similarity can be accurately determined.

Similarly, as shown in FIGS. 10A to 10C, three feature points are selected from the four feature points surrounding the current feature point P2, and three kinds of invariants are denoted respectively by H2$j$ ($j$=1, 2, 3). Each invariant H2$j$ is calculated by the following formula: H2$j$=A2$j$/B2$j$. In this formula, A2$j$ and B2$j$ each indicate the distance between feature points, and the distance between the feature points is calculated based on the coordinate values of respective surrounding feature points in the same manner as described above. In accordance with a similar procedure, invariants can be calculated for the other current feature points.

Based on the invariants calculated for each current feature point, the features calculating section 253 calculates a hash value (features) Hi. The hash value Hi of the current feature point Pi is expressed by Hi=(Hi$1 \times 10^2$+Hi$2 \times 10^1$+Hi$3 \times 10^0$)/E. In this formula, E is a constant determined by the extent to which the remainder is set. For example, when the constant is set to be "10", the remainder falls within "0" to "9", which is the range within which the calculated hash value may fall. Further, i is a natural number, and indicates the number of feature points.

FIGS. 11A to 11D are explanatory diagrams showing still other examples of calculation of invariants with respect to a current feature point P3, and FIGS. 12A to 12D are explanatory diagrams showing still yet other examples of calculation of invariants with respect to a current feature point P4. As shown in FIGS. 11A to 11D, four kinds of combinations may be selected from the four points consisting of the feature points P1, P2, P4, and P5 surrounding the current feature point P3, and similarly to the above-mentioned case, invariants H3$j$ ($j$=1, 2, 3, 4) may be calculated by H3$j$=(A3$j$/B3$j$).

Further, as shown in FIGS. 12A to 12D, four kinds of combinations may be selected from the four points consisting of the feature points P2, P3, P5, and P6 surrounding the current feature point P4, and similarly to the above-mentioned case, invariants H4$j$ ($j$=1, 2, 3, 4) may be calculated by H4$j$=(A4$j$/B4$j$). In the cases of the examples shown in FIGS. 11A to 11D and FIGS. 12A to 12D, the hash value Hi of a current feature point Pi can be calculated by Hi=(Hi1×10$^3$+Hi2×10$^2$+Hi3×10$^1$+Hi4×10$^0$)/E. It should be noted that the above-mentioned hash value serving as features is an example, and the present invention is not limited to this. Alternatively, another hash function may be employed. The above-mentioned examples show the case where four points are extracted as other surrounding feature points; however, the number of points is not limited to four, but six points may be extracted, for example. In this case, five points may be extracted from six feature points, and for each of the six kinds of methods of extracting five points, invariants may be calculated by extracting three points from the five points, so that a hash value may be calculated.

FIGS. 13A and 13B are explanatory diagrams each showing the structure of a hash table. As shown in FIG. 13A, the structure of the hash table includes respective fields of a hash value and an index that indicates a document. More specifically, in association with an index that indicates a document, a point index that indicates a position in the document, and an invariant are stored. In order to determine image similarity, images, document images and the like to be matched are stored in advance in the hash table. The hash table is stored in the memory 256. It should be noted that when hash values are equal to each other (H1=H5) as shown in FIG. 13B, the two entries in the hash table may be unified.

Based on the hash value (features) calculated by the features calculating section 253, the vote processing section 254 searches the hash table stored in the memory 256, and votes for the document (reference image) indicated by the (associated) index stored at the hash value. The result, obtained by accumulating the votes, is outputted to the similarity determination processing section 255.

Based on the voting result inputted from the vote processing section 254, the similarity determination processing section 255 determines whether the read document image is similar to any reference image (reference format), and then outputs the determination result. More specifically, the similarity determination processing section 255 divides the number of obtained votes inputted from the vote processing section 254 by the greatest number of obtained votes of the document image (represented by the following formula: the number of feature points×the number of hash values calculated from one feature point), thus calculating a normalized similarity. Then, the similarity determination processing section 255 compares the calculated similarity with a threshold value Th (e.g., 0.8) defined in advance. When the similarity is greater than or equal to the threshold value Th, the similarity determination processing section 255 determines that the document image is similar to the reference image, the similarity of which has been calculated. When the similarity is smaller than the threshold value Th, the similarity determination processing section 255 determines that there is no reference image similar to the document image, and then outputs the determination result. It should be noted that the number of obtained votes inputted from the vote processing section 254 may be compared with a threshold value defined in advance; then, when the number of obtained votes is greater than or equal to the threshold value, the document image may be determined as being similar to a reference image stored in advance, and furthermore, it may be determined that a reference format, having the greatest number of obtained votes among the reference formats determined as being similar, is identical to the document image.

Figure 14:
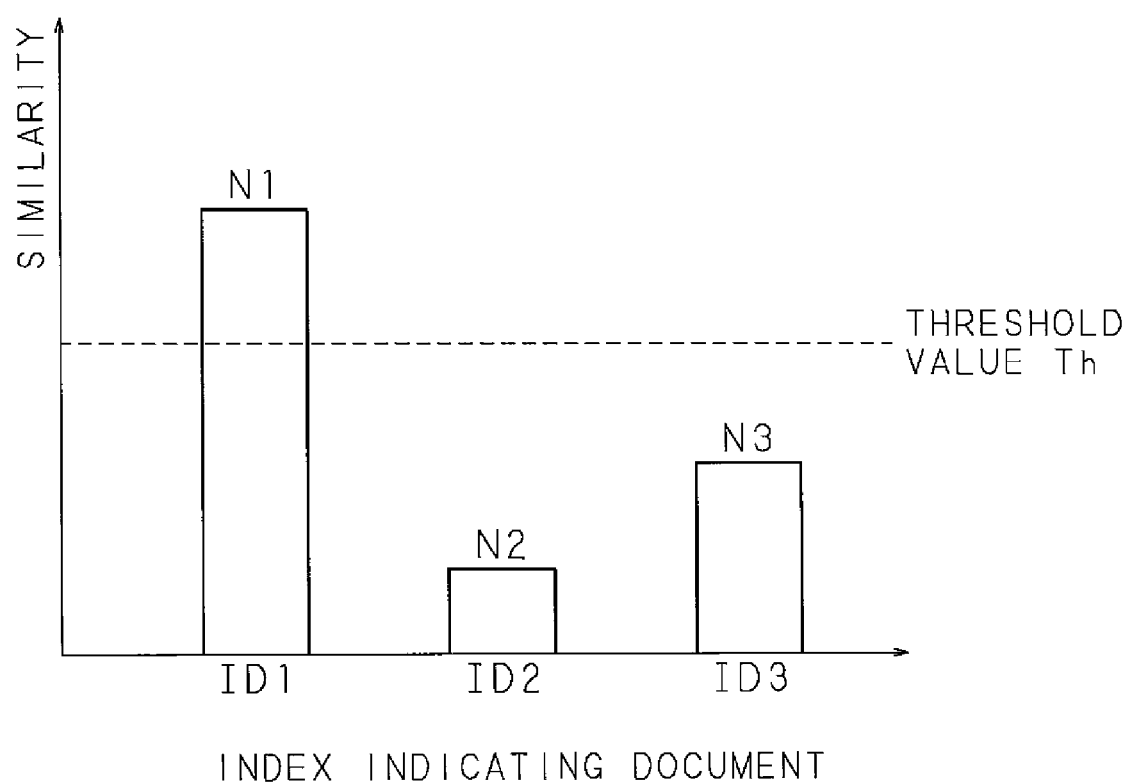
FIG. 14 is an explanatory diagram showing an example of similarity determination based on a voting result.

FIG. 14 is an explanatory diagram showing an example of similarity determination based on a voting result. As shown in FIG. 14, the hash table is searched and voting is performed for each hash value calculated from the document image; as a result, it is assumed that voting has been performed for the reference images in which the document-indicating indices are represented by ID1, ID2, and ID3. Then, each number of obtained votes resulting from the voting is divided by the greatest number of obtained votes of the document image, thus calculating normalized similarities N1, N2, and N3. The reference format having a calculated similarity greater than or equal to the threshold value Th is one represented by the document-indicating index ID1, and therefore, the document image is determined as being similar to the reference image represented by the document-indicating index ID1.

It should be noted that when a predetermined process is performed, e.g., when the document image is determined as being similar to a reference image, based on a determination signal outputted from the document matching process section 25, copying, facsimile transmission, and/or e-mail transmission are/is inhibited to enable an improvement in security, or the document image is stored in a pre-specified folder, thus constituting an electronic filing system in accordance with its security level.

Furthermore, when the document image is to be stored, for example, a document-storing mode is selected in the operation panel 4 of the image forming apparatus 100, so that storing is performed. Whether the document-storing mode is selected is determined by the control section 257. When the document-storing mode is not selected, ordinary operations of copying, filing, e-mail transmission, or the like are performed. It should be noted that, in addition to implementation by a dedicated hardware circuit such as the document matching process section 25, the document storing process may be performed by loading a computer program, which defines the procedure of the document storing process, onto a personal computer provided with a CPU, a RAM, a ROM, and the like, and by causing the CPU to execute the computer program.

Figure 15:
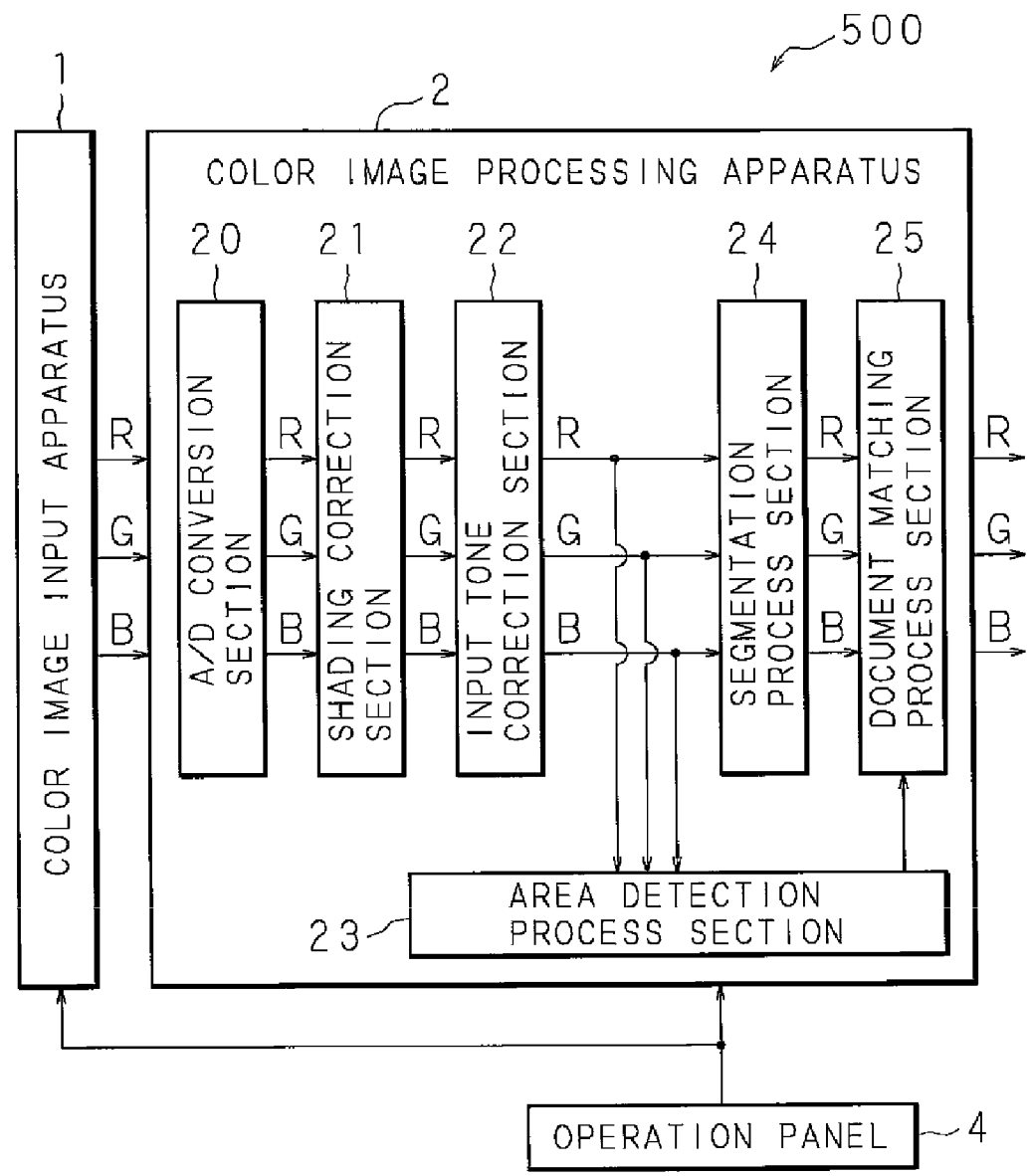
FIG. 15 is a block diagram showing a configuration of an image reading apparatus according to the present invention.

FIG. 15 is a block diagram showing a configuration of an image reading apparatus 500 according to the present invention. As shown in this diagram, the image reading apparatus 500 includes: a color image input apparatus 1; a color image processing apparatus 2; and an operation panel 4, and the color image processing apparatus 2 includes: an A/D conversion section 20; a shading correction section 21; an input tone correction section 22; an area detection process section 23; a segmentation process section 24; and a document matching process section 25. The color image input apparatus 1, the A/D conversion section 20, the shading correction section 21, the input tone correction section 22, the area detection process section 23, the segmentation process section 24, the document matching process section 25, and the operation panel 4 are similar to those of the above-described image forming apparatus 100, and therefore, the description thereof will be omitted.

Figure 16:
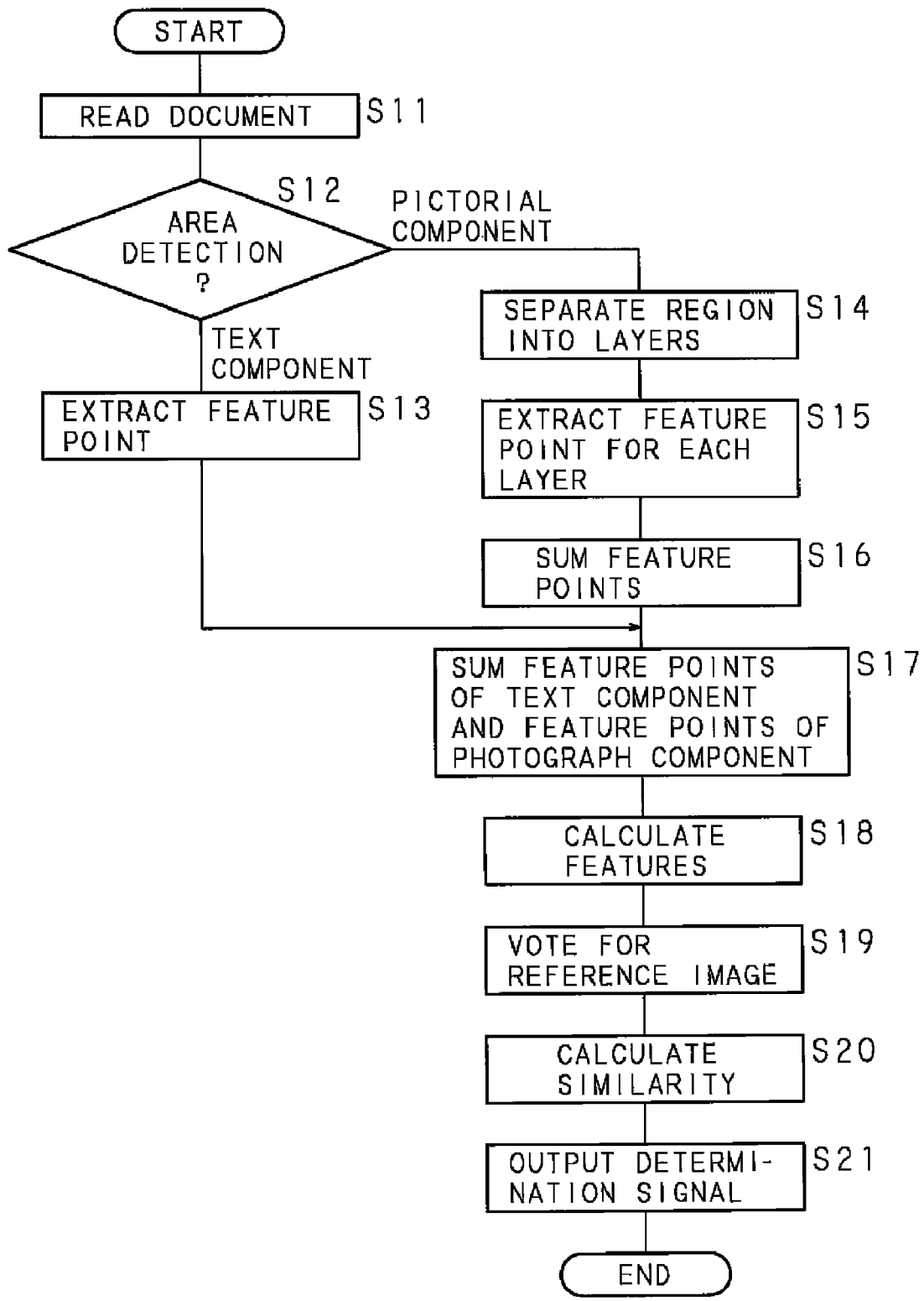
FIG. 16 is a flow chart showing a procedure of a document matching process performed in a color image processing apparatus.

Next, the operation of the color image processing apparatus 2 will be described. FIG. 16 is a flow chart showing the procedure of a document matching process performed by the color image processing apparatus 2 (hereinafter, called a "processing section"). It should be noted that in addition to implementation by a dedicated hardware circuit, the document matching process may be performed by loading a computer program, which defines the procedure of the document matching process, onto a personal computer provided with a CPU, a RAM, a ROM, and the like, and by causing the CPU to execute the computer program.

The processing section reads a document (S11) to obtain a document image. It should be noted that the document image may be obtained by reading the document with a scanner, or may be obtained as electronic data generated by the input of a character, a mark, a diagram, a photograph and the like into an electronic data format with the use of a computer.

Then, the processing section performs area detection of the document image (S12). When the region is determined as being a text component (i.e., when a text component is determined in S12), the processing section extracts a feature point at the region of the document image, which is determined as being a text component (S13). On the other hand, when the region is determined as being a pictorial component (i.e., when a pictorial component is determined in S12), the processing section separates the region of the document image, which is determined as being a pictorial component, into layers (S14).

Subsequently, the processing section extracts a feature point for each layer (S15), and sums the feature points extracted for each layer (S16). Next, the processing section sums the feature points of the text component and the feature points of the pictorial component (S17), calculates a predetermined invariant based on the sum of the feature points, and calculates features (hash value) based on the calculated invariant (S18).

Then, the processing section searches a hash table based on the calculated features, and votes for a reference image associated with the same features (S19). Subsequently, the processing section divides the number of obtained votes, resulting from the voting, by the greatest number of obtained votes of the document image (represented by the following formula: the number of feature points×the number of hash values calculated from one feature point), thus calculating a normalized similarity (S20).

Then, the processing section compares the calculated similarity with a threshold value Th defined in advance. When the similarity is greater than or equal to the threshold value Th, the processing section determines that the document image is similar to the reference image, the similarity of which has been calculated. When the similarity is smaller than the threshold value Th, the processing section determines that there is no reference image similar to the document image, and outputs a determination signal (S21), thereby ending the process It should be noted that if there are a plurality of document images, the above-described process will be naturally repeated.

Embodiment 2

Embodiment 1 described above is implemented so as to sum feature points extracted at a text component and feature points extracted at a pictorial component, but the present invention is not limited to this. For example, the present invention may be implemented so as to perform a voting process for each of a text component and a pictorial component, and sum the number of votes obtained for each component to calculate similarity between a document image and a reference image.

Figure 17:
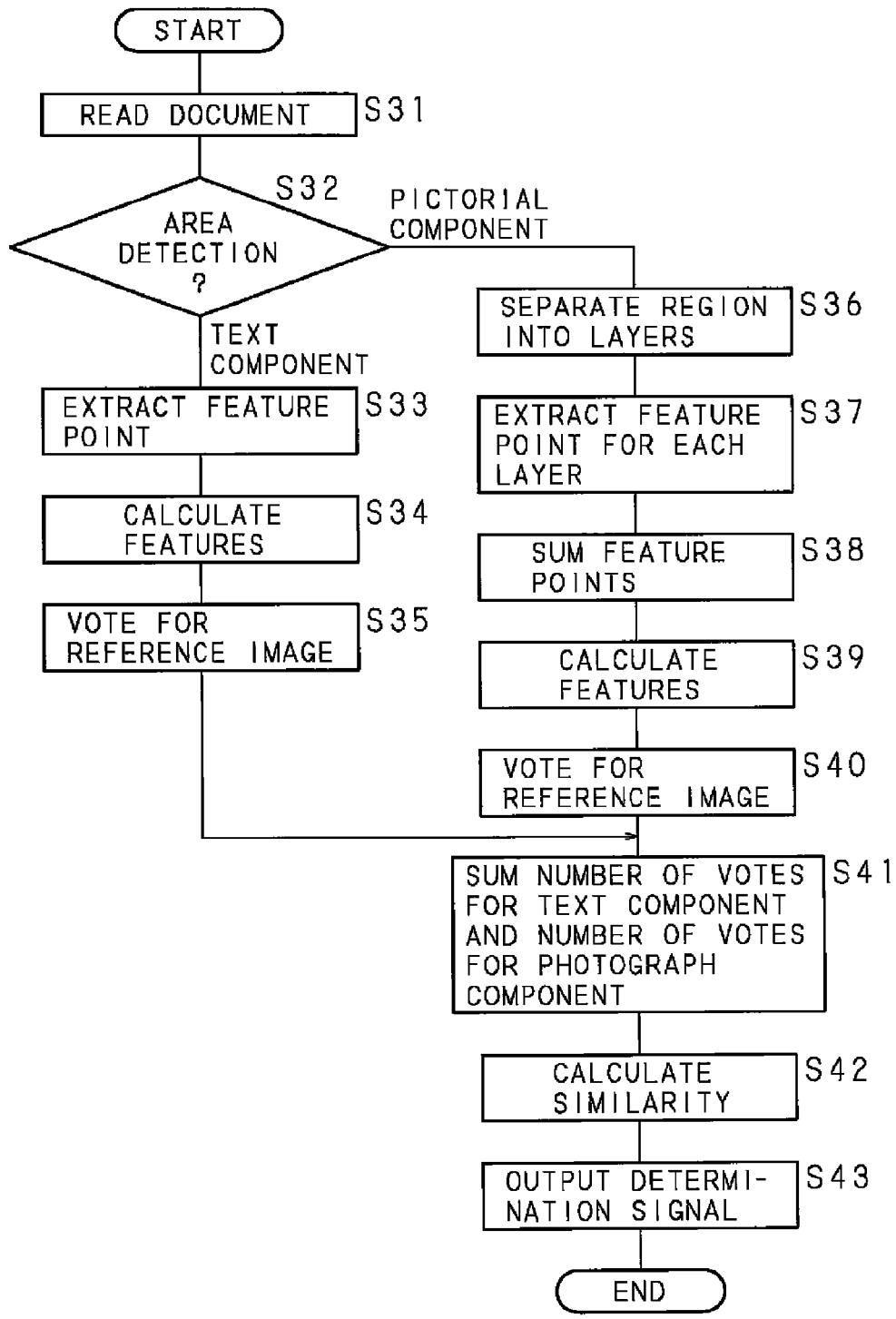
FIG. 17 is a flow chart showing a procedure of a document matching process.

FIG. 17 is a flow chart showing the procedure of a document matching process according to Embodiment 2. The processing section reads a document (S31) to obtain a document image. Then, the processing section performs area detection of the document image (S32). When the region is determined as being a text component (i.e., when a text component is determined in S32), the processing section extracts a feature point at the region of the document image, which is determined as being a text component (S33).

Next, the processing section calculates a predetermined invariant based on the extracted feature point, and calculates features (hash value) based on the calculated invariant (S34). Subsequently, the processing section searches a hash table based on the calculated features, and votes for a reference image associated with the same features (S35).

On the other hand, when the region is determined as being a pictorial component (i.e. when a pictorial component is determined in S32), the processing section separates the region of the document image, which is determined as being a pictorial component, into layers (S36). Subsequently, the processing section extracts a feature point for each layer (S37), and sums the feature points extracted for each layer (S38).

Then, the processing section calculates a predetermined invariant based on the summed feature points, and calculates features (hash value) based on the calculated invariant (S39). Subsequently, the processing section searches the hash table based on the calculated features, and votes for a reference image associated with the same features (S40).

Then, the processing section sums the number of votes obtained for the text component and the number of votes obtained for the pictorial component (S41), and divides the sum of the numbers of the obtained votes by the greatest number of obtained votes of the document image (represented by the following formula: the number of feature points×the number of hash values calculated from one feature point), thus calculating a normalized similarity (S42).

Subsequently, the processing section compares the calculated similarity with a threshold value Th defined in advance. When the similarity is greater than or equal to the threshold value Th, the processing section determines that the document image is similar to the reference image, the similarity of which has been calculated. When the similarity is smaller than the threshold value Th, the processing section determines that there is no reference image similar to the document image, and outputs a determination signal (S43), thereby ending the process.

Embodiment 3

Embodiment 2 described above is implemented so as to perform a voting process for each of a text component and a pictorial component, and sum the number of votes obtained for each component to calculate similarity between a document image and a reference image, but the present invention is not limited to this. For example, the present invention may be implemented so as to calculate similarity for each of a text component and a pictorial component, and ultimately determine, in accordance with the calculated result, whether the document image is similar to the reference image.

Figure 18:
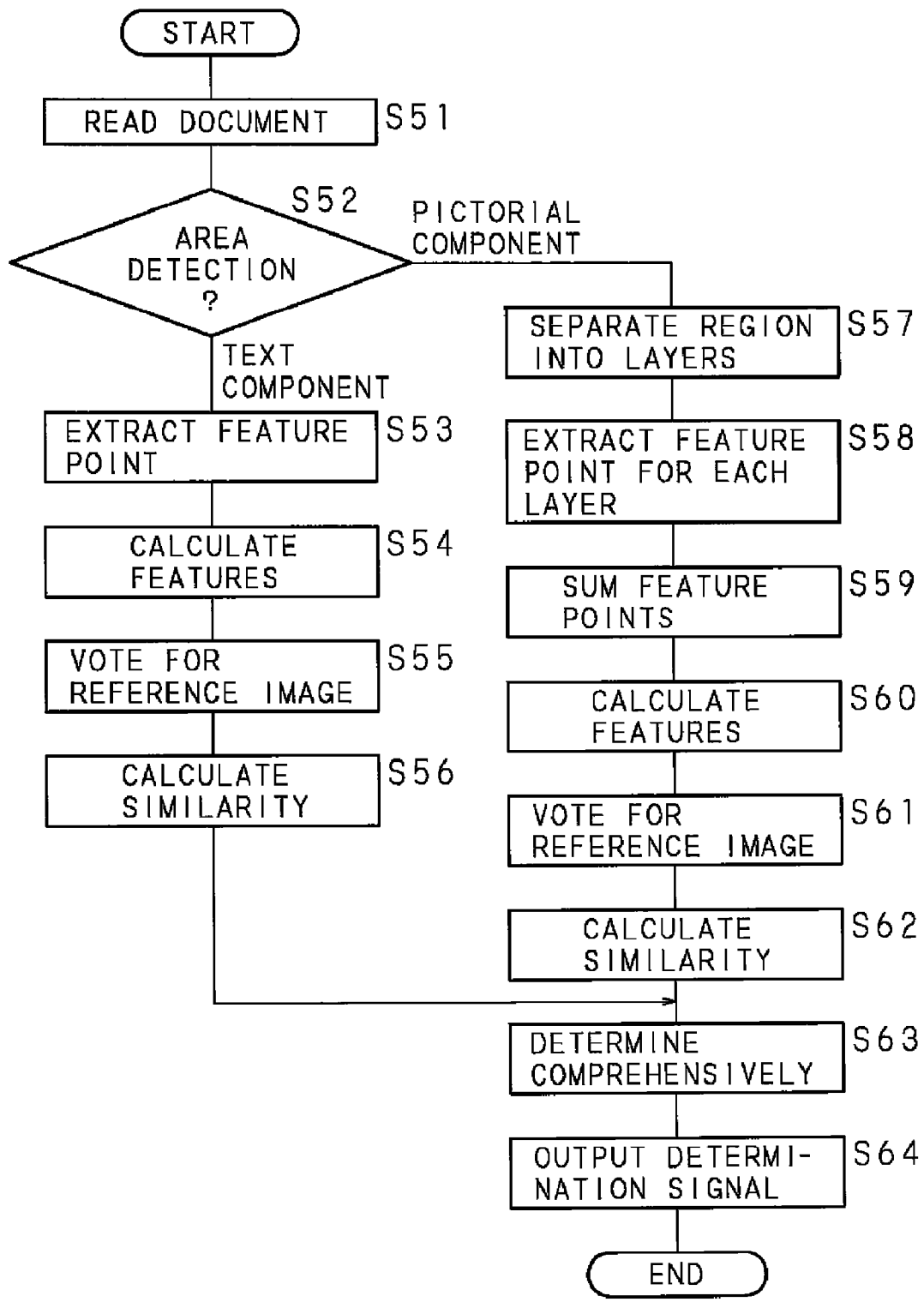
FIG. 18 is a flow chart showing a procedure of a document matching process.

FIG. 18 is a flow chart showing the procedure of a document matching process according to Embodiment 3. The processing section reads a document (S51) to obtain a document image. Then, the processing section performs area detection of the document image (S52). When the region is determined as being a text component (i.e., when a text component is determined in S52), the processing section extracts a feature point at the region of the document image, which is determined as being a text component (S53).

Next, the processing section calculates a predetermined invariant based on the extracted feature point, and calculates features (hash value) based on the calculated invariant (S54). Subsequently, the processing section searches a hash table based on the calculated features, and votes for a reference image associated with the same features (S55).

Then, the processing section divides the number of the votes, obtained as a result of the voting, by the greatest number of votes obtained for the text component of the document image (represented by the following formula: the number of feature points×the number of hash values calculated from one feature point), thus calculating a normalized similarity (S56).

On the other hand, when the region is determined as being a pictorial component (i.e., when a pictorial component is determined in S52), the processing section separates the region of the document image, which is determined as being a pictorial component, into layers (S57). Subsequently, the processing section extracts a feature point for each layer (S58), and sums the feature points extracted for each layer (S59).

Then, the processing section calculates a predetermined invariant based on the sum of the feature points, and calculates features (hash value) based on the calculated invariant (S60). Subsequently, the processing section searches the hash table based on the calculated features, and votes for a reference image associated with the same features (S61).

Then, the processing section divides the number of the votes, obtained as a result of the voting, by the greatest number of votes obtained for the pictorial component of the document image (represented by the following formula: the number of feature points×the number of hash values calculated from one feature point), thus calculating a normalized similarity (S62).

Subsequently, the processing section comprehensively determines whether the document image is similar to the reference image in accordance with the similarity calculated for the text component and the similarity calculated for the pictorial component (S63). A method for comprehensively determining similarity can be appropriately decided. For example, a document image may be determined to be similar to a reference image associated with the greatest value of similarity, or a text component and a pictorial component may be prioritized to determine similarity in order of priority. Alternatively, weights may be assigned to the similarity of a text component and that of a pictorial component to make a determination in accordance with the weighted similarities.

Then, the processing section outputs a determination signal in accordance with the comprehensive determination result (S64), thereby ending the process.

Embodiment 4

In the foregoing embodiments, an invariant is calculated using feature points in the same layer when determining features of a pictorial component, but the present invention is not limited to this. Alternatively, with respect to a current feature point existing in a certain layer, feature points existing in adjacent other layers may be included in determining an invariant.

Figure 19:
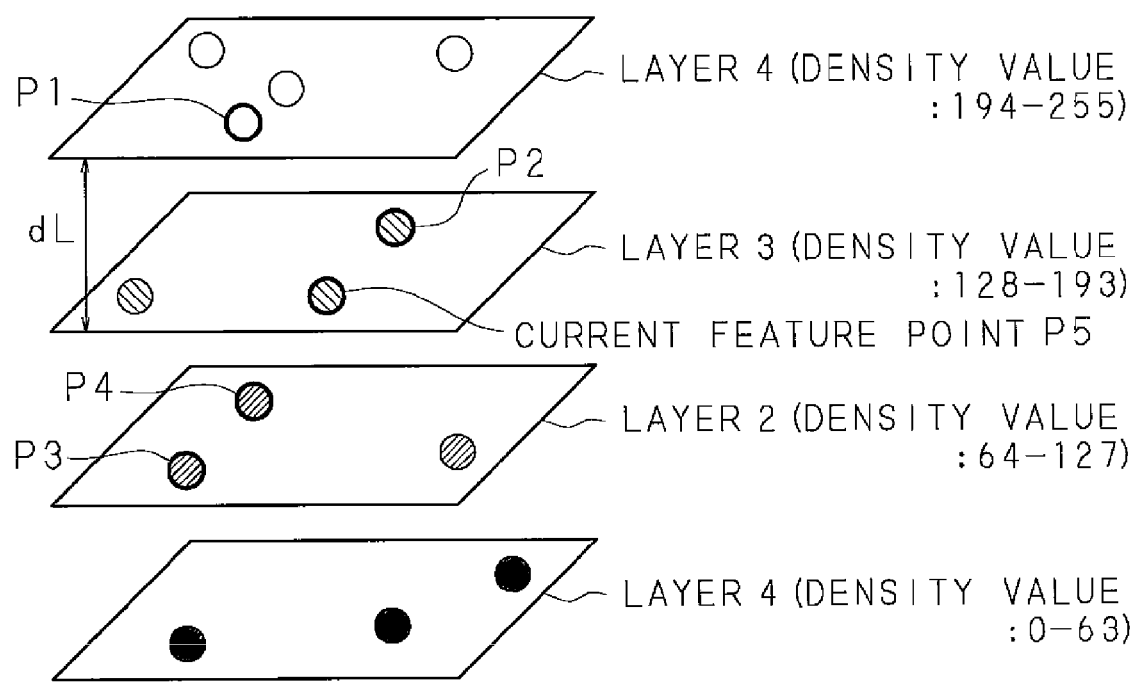
FIG. 19 is an explanatory diagram showing a current feature point and surrounding feature points.

FIG. 19 is an explanatory diagram showing a current feature point and surrounding feature points according to Embodiment 4. As shown in FIG. 19, for example, with respect to a current feature point P5 existing in a layer 3 among a plurality of layers, surrounding feature points existing in adjacent other layers as well as a surrounding feature point existing in the layer 3 (i.e., a feature point P1 in a layer 4, a feature point P2 in the layer 3, and feature points P3 and P4 in a layer 2) are extracted in ascending order of the distance from the current feature point P5. In this case, since the surrounding feature points are selected according to the distance from the current feature point, the feature point in the layer 3, in which the current feature point P5 exists, is also to be extracted. The example of FIG. 19 shows the case where four surrounding feature points are extracted with respect to the current feature point, but the number of surrounding feature points to be extracted is not limited to four. It should be noted that a distance dL between layers can be set in advance.

Figure 20:
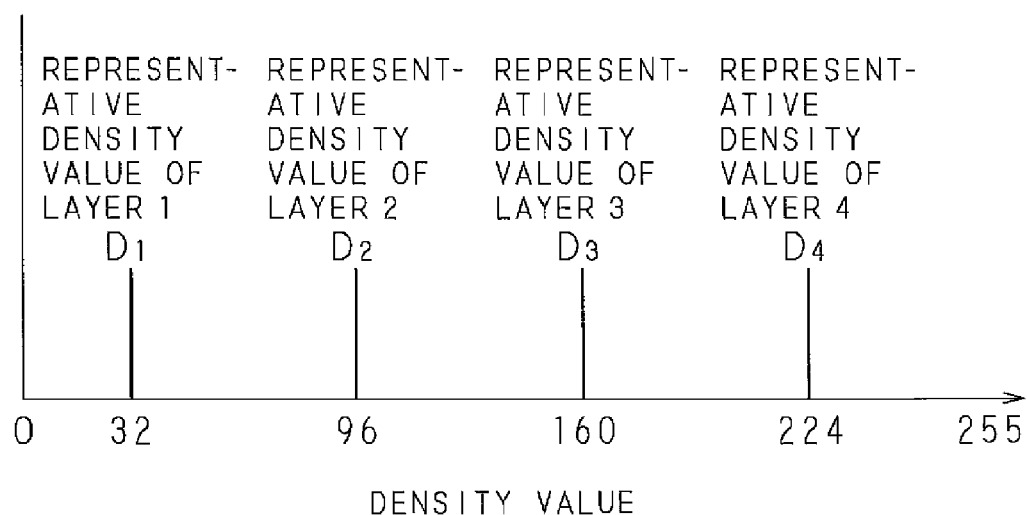
FIG. 20 is an explanatory diagram showing an example of calculation of a distance between layers.
Figure 23:
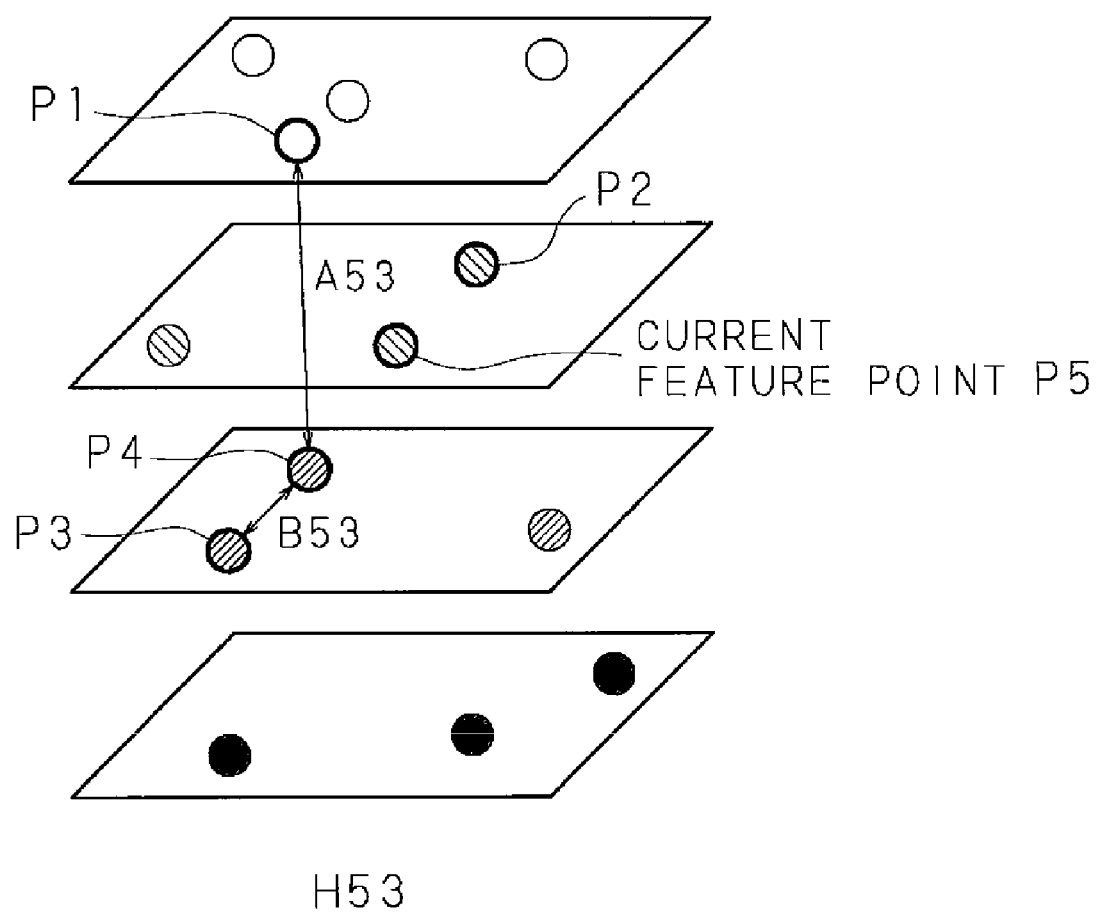
FIG. 23 is an explanatory diagram showing still another example of calculation of an invariant with respect to a current feature point.

Next, an example for calculating a distance dL between layers will be described. FIG. 20 is an explanatory diagram showing an example of calculation of a distance dL between layers. As shown in FIG. 20, representative density values D1-D4 are set for the respective layers 1-4. The number of gray levels is 256 levels (8 bits) and the largest layer distance Lmax according to the most density value (255) is set.

The dL12 between the layer 2 and layer 1 is calculated by dL12=|D2−D1|×Lmax/256. For example, when the most layer distance Lmax=32, the representative density value D1 of layer 1=32 (a median value of density values 0 to 63), and the representative density value D2 of layer 2=96 (a median value of density values 64 to 127) are set, the distance dL12 between the layer 2 and layer 1 becomes 8. For example, in case of an image of 300 dpi, a text of 10 points has about 32×32 pixels, and the most layer distance Lmax is set to be 32 so as to make the influence degree of feature points in the same layer and the influence degree between layers equal. According to the above-described similar method, both of the distance dL23 between the layer 2 and layer 3 and the distance dL34 between the layer 3 and layer 4 are set to be 8. In addition, the method of calculating distance between layers is not limited to the above example.

FIG. 21, FIG. 22, FIG. 23 and FIG. 24 are each an explanatory diagram showing an example of calculation of an invariant with respect to the current feature point P5 according to Embodiment 4. As shown in FIGS. 21 to 24, four kinds of combinations are selected from the four points consisting of the feature points P1, P2, P3, and P4 surrounding the current feature point P5, and invariants H5j (j=1, 2, 3, 4) are calculated by H5j=(A5j/B5j). In this case, a hash value Hi of a current feature point Pi can be calculated by $Hi=(Hi1 \times 10^3 + Hi2 \times 10^2 + Hi3 \times 10^1 + Hi4 \times 10^0)/E$.

Even if the features are the same on a two-dimensional plane (i.e., on the same layer), the features may differ in a three-dimensional space (i.e., in different layers); therefore, the features (invariants) are calculated by including the spatial arrangement of the feature points, thereby enabling a further improvement in the accuracy of document image matching.

Figure 25:
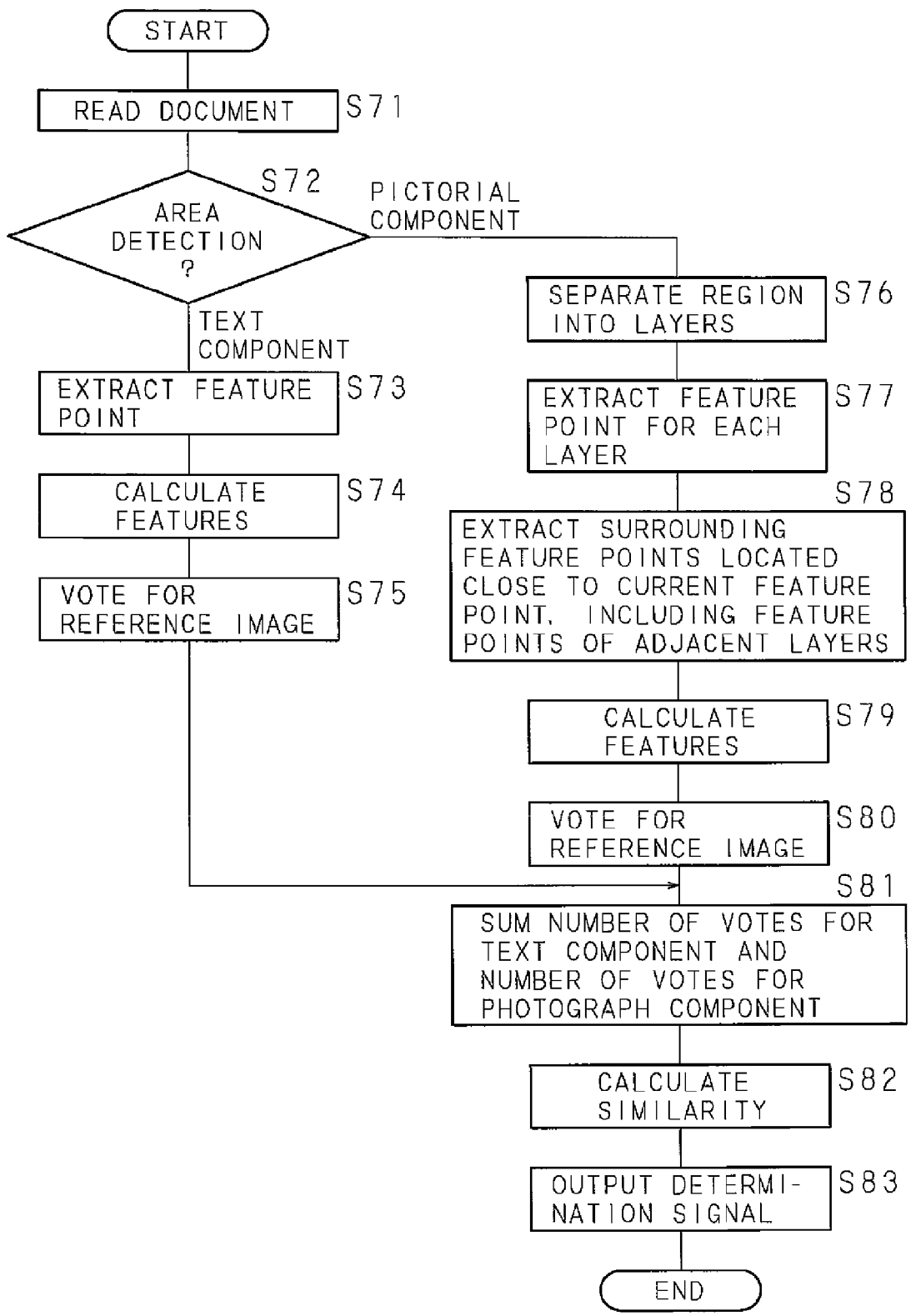
FIG. 25 is a flow chart showing a procedure of a document matching process.

FIG. 25 is a flow chart showing the procedure of a document matching process according to Embodiment 4. It should be noted that the example shown in FIG. 25 is associated with Embodiment 2. The processing section reads a document (S71) to obtain a document image. Then, the processing section performs area detection of the document image (S72).

When the region is determined as being a text component (i.e., when a text component is determined in S72), the processing section extracts a feature point at the region of the document image, which is determined as being a text component (S73).

Next, the processing section calculates a predetermined invariant based on the extracted feature point, and calculates features (hash value) based on the calculated invariant (S74). Subsequently, the processing section searches a hash table based on the calculated features, and votes for a reference image associated with the same features (S75). The processing section executes the process of step S81 described below.

On the other hand, when the region is determined as being a pictorial component (i.e., when a pictorial component is determined in S72), the processing section separates the region of the document image, which is determined as being a pictorial component, into layers (S76). Subsequently, the processing section extracts a feature point for each layer (S77), and extracts surrounding feature points located close to a current feature point, including feature points of the adjacent layers (S78).

Then, the processing section calculates a predetermined invariant based on the extracted feature points, and calculates features (hash value) based on the calculated invariant (S79). Subsequently, the processing section searches the hash table based on the calculated features, and votes for a reference image associated with the same features (S80).

Then, the processing section sums the number of votes obtained for the text component and the number of votes obtained for the pictorial component (S81), and divides the sum of the numbers of the obtained votes by the greatest number of obtained votes of the document image (represented by the following formula: the number of feature points×the number of hash values calculated from one feature point), thus calculating a normalized similarity (S82).

Subsequently, the processing section compares the calculated similarity with a threshold value Th defined in advance. When the similarity is greater than or equal to the threshold value Th, the processing section determines that the document image is similar to the reference image, the similarity of which has been calculated. When the similarity is smaller than the threshold value Th, the processing section determines that there is no reference image similar to the document image, and outputs a determination signal (S83), thereby ending the process.

Figure 26:
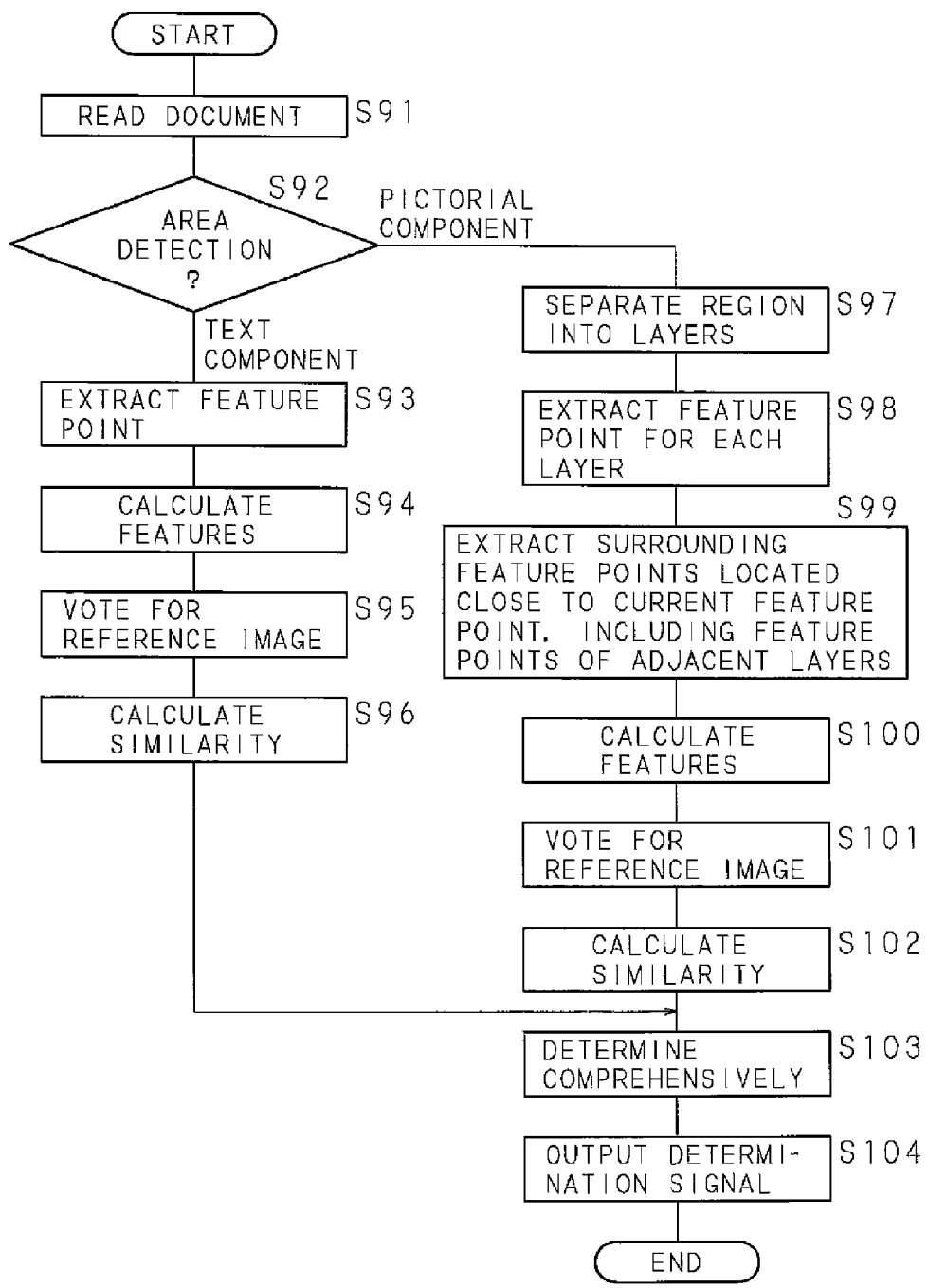
FIG. 26 is a flow chart showing another procedure of a document matching process.

FIG. 26 is a flow chart showing another procedure of a document matching process according to Embodiment 4. It should be noted that the example shown in FIG. 26 is associated with Embodiment 3. The processing section reads a document (S91) to obtain a document image. Then, the processing section performs area detection of the document image (S92). When the region is determined as being a text component (i.e., when a text component is determined in S92), the processing section extracts a feature point at the region of the document image, which is determined as being a text component (S93).

Next, the processing section calculates a predetermined invariant based on the extracted feature point, and calculates features (hash value) based on the calculated invariant (S94). Subsequently, the processing section searches a hash table based on the calculated features, and votes for a reference image associated with the same features (S95).

Then, the processing section divides the number of the votes, obtained as a result of the voting, by the greatest number of votes obtained for the text component of the document image (represented by the following formula: the number of feature points×the number of hash values calculated from one feature point), thus calculating a normalized similarity (S96).

The processing section executes the process of step S103 described below.

On the other hand, when the region is determined as being a pictorial component (i.e., when a pictorial component is determined in S92), the processing section separates the region of the document image, which is determined as being a pictorial component, into layers (S97). Subsequently, the processing section extracts a feature point for each layer (S98), and extracts surrounding feature points located close to a current feature point, including feature points of the adjacent layers (S99).

Then, the processing section calculates a predetermined invariant based on the extracted feature points, and calculates features (hash value) based on the calculated invariant (S100). Subsequently, the processing section searches the hash table based on the calculated features, and votes for a reference image associated with the same features (S101).

Then, the processing section divides the number of the votes, obtained as a result of the voting, by the greatest number of votes obtained for the pictorial component of the document image (represented by the following formula: the number of feature points×the number of hash values calculated from one feature point), thus calculating a normalized similarity (S102).

Subsequently, the processing section comprehensively determines whether the document image is similar to the reference image in accordance with the similarity calculated for the text component and the similarity calculated for the pictorial component (S103). A method for comprehensively determining similarity can be appropriately decided. For example, a document image may be determined to be similar to a reference image associated with the greatest value of similarity, or a text component and a pictorial component may be prioritized to determine similarity in order of priority. Alternatively, weights may be assigned to the similarity of a text component and that of a pictorial component to make a determination in accordance with the weighted similarities.

Then, the processing section outputs a determination signal in accordance with the comprehensive determination result (S104), thereby ending the process.

Embodiment 5

The present invention may be applied to electronic data (e.g., data generated by application software) or scanned filing data (e.g., data generated by converting data, read by a scanner, into a predetermined file format such as JPEG or PDF). For example, data provided in the form of electronic data or scanned filing data may be stored in a server, and the present invention in the form of application software may be applied to such data. Preferably, the data described above is stored for each electronic data and file format.

As for electronic data, several kinds of software can be used. Thus, for example, using a RIP (Raster Image Processor), PDL (Page Description Language) may be interpreted and converted into a raster image (RGB data), so that the method of the present invention may be applied. Further, as for scanned filing data, for example, in the case of an encoded image format such as JPEG or GIF, the method of the present invention may be applied after decoding has once been performed and then color conversion processing of converting YCC signals into RGB signals has been performed when necessary. Furthermore, as for a PDF format, when the image data is saved in an encoded image format such as JPEG, the method of the present invention may be applied after decoding and conversion into RGB signals have been performed.

As for a vector data part such as a font, the method of the present invention may be applied after conversion into image data of RGB has been performed by a RIP or the like. It should be noted that in the case of a PDF format, information concerning each object (such as a text, a diagram, and a photograph) is stored as a tag. Thus, the data conversion can be performed with reference to this information. For example, in the case of a text, the information concerning an object includes the font, the point size, the color, or the display position. In the case of a photograph, the information includes the coding method, the size, or the display position.

As described thus far, even if a document image is a photograph image represented in a continuous tone, the present invention reduces the tone range for each layer image to further facilitate the determination of a connected component, and clearly defines the boundary of the connected component to enable accurate feature point extraction, thus improving the accuracy of matching with a reference image. Moreover, even in the case of a document image in which a text component and a pictorial component are mixed, the document image can be accurately matched with a reference image.

Each of Embodiments 1 to 4 described above is implemented so that the area detection process section 23 determines whether a region of a document is a text component or a pictorial component, and processes (e.g., feature point extraction, voting process, similarity calculation) are performed separately for the respective components, but the present invention is not limited to this. For example, regardless of whether a region of a document image is a text component or a pictorial component, the entire document image may be separated into a plurality of layers (layer images) so as to extract a feature point for each layer image, without performing any area detection process. Thus, hardware mechanism provided in an image processing apparatus can be reduced to enable the cost reduction, and the decrease of throughput when each process is performed by software, thus making it possible to realize high-speed processing.

Each of Embodiments 1 to 4 described above is implemented so that the area detection process section 23 determines whether a region of a document image is a text component or a pictorial component, and processes are performed separately for the respective components. However, the present invention may be implemented so as to select a process for a text component or a process for a pictorial component in accordance with the region determination result, and perform the selected process for the entire document image. In this case, for example, whether either process should be performed may be determined in accordance with the sizes of a region determined as being a text component and a region determined as being a pictorial component.

The above-mentioned embodiment is implemented so that the reference formats and hash table are stored in the memory 256 in advance, but the present invention is not limited to this. Alternatively, the reference formats may be stored in a storage section of a server device connected to the image forming apparatus 100 through a communication line (network), while the hash table may be stored in the memory 256 in a distributed manner.

In the present invention, an image processing method for performing the above-described document matching process may be recorded on a computer-readable memory product on which program codes of programs (e.g., executable program, intermediate code program, and source program) to be executed by a computer are recorded. It should be noted that the memory product may be a program medium such as a memory (not shown) or a ROM, for example, so that processing can be performed by a microcomputer, or may be a program medium that is readable by providing a program reading device such as an external storage section, and inserting a memory product thereinto. In either case, the stored program code may be accessed and executed by a microprocessor Alternatively, the program code may be read, the read program code may be downloaded into a program storage area (not shown) in a microcomputer, and then the program code may be executed. In this case, a program for download is stored in the main device in advance.

The above-mentioned program medium is a memory product separable from the main body, and may be: a tape system such as a magnetic tape and a cassette tape; a disk system such as a magnetic disk (including a flexible disk and a hard disk) and an optical disk such as a CD-ROM, an MO (Magneto Optical), an MD (Mini disk) and a DVD (Digital Versatile Disk); a card system such as an IC (Integrated Circuit) card (including a memory card) and an optical card; or a medium that carries a program in a fixed manner, including a semiconductor memory such as a mask ROM, an EPROM (Erasable Programmable ROM), an EEPROM (Electrically Erasable Programmable ROM), and a flash ROM.

Further, in the case of a system configuration that permits connection to a communication network including the Internet, the medium may carry the program code in a constantly changing manner, for example, by downloading the program code from a communication network. It should be noted that when the program code is to be downloaded from a communication network in such a manner, a program for download may be stored in the main device in advance, or may alternatively be installed from another memory product. It should also be noted that the present invention may be implemented in the form of a computer data signal in which the above-mentioned program code is embedded in a carrier wave embodied by electronic transmission.

The above-mentioned memory product is read by a program reading device provided in a digital color image forming apparatus or a computer system, thus executing the above-described image processing method. Furthermore, the computer system is implemented by: an image input apparatus such as a flat-bed scanner, a film scanner, or a digital camera; a computer for performing various processes, including the above-described image processing method, by loading a predetermined program thereon; an image display device such as a CRT display or a liquid crystal display for displaying computer-processed results; and a printer for outputting the computer-processed results onto a recording paper sheet. Moreover, as communication means for connecting with, for example, a server via a network, a network card, a modem and the like may be provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method for extracting features of a document image composed of a plurality of pixels, and for determining similarity between the document image and a reference image based on the extracted features, the method comprising steps of:

storing features associated with each of a plurality of the reference images in advance;

generating, based on a pixel value of each pixel of the document image, a plurality of layer images having different pixel value ranges;

performing a binarization process on each of the generated layer images to extract a feature point;

calculating features of the document image based on the feature point extracted for each of the layer images;

determining whether the calculated features corresponds to the features associated with the reference image;

voting for, when the features are determined to be corresponding to each other, the reference image associated with the features for each corresponding features;

determining, based on the number of votes obtained by the voting, whether the document image is similar to the reference image;

determining, based on the pixel value of each pixel of the document image, whether at least a region of the document image is a text component or a pictorial component; and generating a plurality of layer images for the region determined as being a pictorial component, wherein one or more of the steps are performed using one or more processors.

2. The image processing method according to claim 1, further comprising steps of:

performing, for the region determined as being a text component, a binarization process on the document image to extract a feature point;

extracting, for the region determined as being a pictorial component, a feature point for each of the layer images; and calculating features of the document image based on the feature point extracted for each component.

3. The image processing method according to claim 1, further comprising steps of:

performing, for the region determined as being a text component, a binarization process on the document image to extract a feature point;

extracting, for the region determined as being a pictorial component, a feature point for each of the layer images;

calculating, for each component, features based on the extracted feature point;

determining whether the calculated features corresponds to the features associated with the reference image;

voting for, when the features are determined to be corresponding to each other, the reference image associated with the features for each corresponding features;

summing, for each component, the number of votes obtained by the voting; and determining, based on the sum of the number of the obtained votes, whether the document image is similar to the reference image.

4. The image processing method according to claim 1, further comprising steps of:

performing, for the region determined as being a text component, a binarization process on the document image to extract a feature point;

extracting, for the region determined as being a pictorial component, a feature point for each of the layer images;

calculating, for each component, features based on the extracted feature point;

determining whether the calculated features corresponds to the features associated with the reference image;

voting for, when the features are determined to be corresponding to each other, the reference image associated with the features for each corresponding features;

determining, based on the number of the votes obtained by the voting, whether the document image is similar to the reference image for each component; and determining, based on a result determined for each component, whether the document image is similar to the reference image.

5. The image processing method according to claim 1, further comprising steps of:

extracting, for the region determined as being a pictorial component, a feature point from the plurality of layer images; and calculating features of the document image based on the extracted feature point.

6. An image processing apparatus for extracting features of a document image composed of a plurality of pixels, and for determining similarity between the document image and a reference image based on the extracted features, the apparatus comprising:

a storage section for storing features associated with each of a plurality of the reference images in advance;

a generation section for generating, based on a pixel value of each pixel of the document image, a plurality of layer images having different pixel value ranges;

an extraction section for performing a binarization process on each of the layer images, generated by the generation section, to extract a feature point;

a calculation section for calculating features of the document image based on the feature point extracted by the extraction section for each of the layer images;

a features determination section for determining whether the features, calculated by the calculation section, corresponds to the features associated with the reference image;

a voting section for voting for, when the features are determined to be corresponding to each other by the features determination section, the reference image associated with the features for each corresponding features;

a similarity determination section for determining, based on the number of votes obtained by the voting of the voting section, whether the document image is similar to the reference image; and an area detection section for determining, based on the pixel value of each pixel of the document image, whether at least a region of the document image is a text component or a pictorial component, wherein the generation section generates a plurality of layer images for the region determined as being a pictorial component by the area detection section.

7. The image processing apparatus according to claim 6, wherein the extraction section performs, for the region determined as being a text component by the area detection section, a binarization process on the document image to extract a feature point, while the extraction section extracts, for the region determined as being a pictorial component by the area detection section, a feature point for each of the layer images, and wherein the calculation section calculates features of the document image based on the feature point extracted for each component.

8. The image processing apparatus according to claim 6, wherein the extraction section performs, for the region determined as being a text component by the area detection section, a binarization process on the document image to extract a feature point, while the extraction section extracts, for the region determined as being a pictorial component by the area detection section, a feature point for each of the layer images, wherein the calculation section, the features determination section, and the voting section perform the respective processes for each component, wherein the apparatus further comprises a summing section for summing the number of votes obtained by the voting of the voting section for each component, and wherein the similarity determination section determines, based on the number of the obtained votes summed by the summing section, whether the document image is similar to the reference image.

9. The image processing apparatus according to claim 6, wherein the extraction section performs, for the region determined as being a text component by the area detection section, a binarization process on the document image to extract a feature point, while the extraction section extracts, for the region determined as being a pictorial component by the area detection section, a feature point for each of the layer images, wherein the calculation section, the features determination section, the voting section, and the similarity determination section perform the respective processes for each component, and wherein the apparatus further comprises a comprehensive determination section for determining, based on a result determined for each component by the similarity determination section, whether the document image is similar to the reference image.

10. The image processing apparatus according to claim 6, wherein the extraction section extracts, for the region determined as being a pictorial component by the area detection section, a feature point from the plurality of layer images, and wherein the calculation section calculates features of the document image based on the feature point extracted by the extraction section.

11. An image forming apparatus comprising:

the image processing apparatus according to claim 6; and an image output apparatus for forming an image processed by the image processing apparatus.

12. A non-transitory computer-readable memory product which stores a computer program for causing a computer to extract features of a document image composed of a plurality of pixels, and to determine similarity between the document image and a reference image based on the extracted features, wherein the computer program comprises steps of:

causing the computer to generate, based on a pixel value of each pixel of the document image, a plurality of layer images having different pixel value ranges;

causing the computer to perform a binarization process on each of the generated layer images to extract a feature point;

causing the computer to calculate features of the document image based on the feature point extracted for each of the layer images;

causing the computer to determine whether the calculated features corresponds to the features associated with the reference image;

causing the computer to vote for, when the features are determined to be corresponding to each other, the reference image associated with the features for each corresponding features;

causing the computer to determine, based on the number of votes obtained by the voting, whether the document image is similar to the reference image;

determining, based on the pixel value of each pixel of the document image, whether at least a region of the document image is a text component or a pictorial component; and generating a plurality of layer images for the region determined as being a pictorial component.

\* \* \* \* \*